(12) United States Patent
Ikeda et al.

(10) Patent No.: US 6,574,735 B2
(45) Date of Patent: *Jun. 3, 2003

(54) INFORMATION SIGNAL RECORDING/ REPRODUCING SYSTEM, INFORMATION SIGNAL RECORDING DEVICE, INFORMATION SIGNAL REPRODUCING DEVICE AND INFORMATION SIGNAL RECORDING/REPRODUCING PROCESS

(75) Inventors: Nozomu Ikeda, Tokyo (JP); Akira Ogino, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/854,984

(22) Filed: May 14, 2001

(65) Prior Publication Data

US 2002/0128974 A1 Sep. 12, 2002

Related U.S. Application Data

(62) Division of application No. 09/131,095, filed on Aug. 7, 1998.

(30) Foreign Application Priority Data

Aug. 29, 1997 (JP) .............................. 9-234693

(51) Int. Cl.$^7$ .............................................. G06F 12/14
(52) U.S. Cl. ...................................... 713/200; 380/203
(58) Field of Search ................................ 713/200, 193, 713/176; 380/203, 205, 204, 201; 705/57, 58

(56) References Cited

U.S. PATENT DOCUMENTS

| 5,774,452 A | * | 6/1998 | Wolosewicz | 370/212 |
| 6,282,654 B1 | * | 8/2001 | Ikeda et al. | 713/200 |
| 6,285,774 B1 | * | 9/2001 | Schumann et al. | 382/100 |
| 6,359,999 B1 | * | 3/2002 | Moriwaki et al. | 382/100 |
| 6,381,262 B1 | * | 4/2002 | Ogino | 375/147 |

* cited by examiner

*Primary Examiner*—James P. Trammell
*Assistant Examiner*—Pierre E. Elisca
(74) *Attorney, Agent, or Firm*—Jay H. Maioli

(57) ABSTRACT

When digital image signals fed in through an input terminal are to be recorded on a disc, medium-related information, such as a serial number recorded in a table of contents of the disc, is read from the disc and is spectrum-spread in a spectrum spreading additional information generating section and then the digital image signals on which the spectrum-spread medium-related information has been superimposed in a spectrum spreading additional information superimposing section are recorded on the disc. When the signals are to be reproduced, the reproduction can be performed only if the medium-related information superimposed on the image signals recorded on the disc is consistent with the medium-related information of the disc on which the image signals are recorded. Thus, copying of the information signals can be limited to copying for private use.

15 Claims, 14 Drawing Sheets

ADDITIONAL INFORMATION SPECTRUM
BEFORE SPECTRUM-SPREADING

ADDITIONAL INFORMATION SPECTRUM
AFTER SPECTRUM-SPREADING

SPECTRUM OF INFORMATION SIGNALS TO WHICH THE SS ADDITIONAL INFORMATION IS ADDED

SPECTRUM OF INFORMATION SIGNALS AFTER INVERSE SPECTRUM-SPREADING AT THE RECORDING DEVICE INFORMATION SIGNALS

INFORMATION SIGNAL RECORDING/REPRODUCING SYSTEM, INFORMATION SIGNAL RECORDING DEVICE, INFORMATION SIGNAL REPRODUCING DEVICE AND INFORMATION SIGNAL RECORDING/REPRODUCING PROCESS

This is a division of prior application Ser. No. 09/131,095 filed Aug. 7, 1998.

BACKGROUND OF THE INVENTION

1. Field of the Invention

The present invention relates to a recording/reproducing system and a recording/reproducing process for adding additional information to information signals, such as image signals, and recording the resultant signals on a recording medium, and for, in reproduction, picking up the additional information added to the information signals and then performing control for reproduction; and a recording device and a reproducing device for use in the aforementioned system and process.

2. Description of Related Art

Recently, there have been provided many reproducing devices such as a digital VTR and a reproducing device for a DVD (Digital Video Disc), and softwares which can be reproduced by use of these devices. Digitized image signals and sound signals have been easily reproduced at home so that images with good image quality can be watched and sounds with good sound quality can be listened to.

Furthermore, there have been also provided abundant image signals and sound signals, or programs through Internet and recording media such as a CD-ROM (Compact Disc ROM), and the digitized softwares provided through Internet and the recording media such as a CD-ROM have been widely used in a personal computer or the like.

However, it is feared that the softwares such as digital image signals provided abundantly in such a manner as above are copied without any restriction. Hitherto, therefore, various copy preventing methods have been adopted to prevent illegal copying of information signals such as image signals and sound signals.

As one of the copy preventing methods, there is known a copy limiting system over plural generations called CGMS (copy generation management system) In this system, 3-stage classified copy control information, i. e., information that copying is free, that copying is allowable for the first generation, or that any copying is prohibited is embedded on an information signal. For example, in the case wherein copying is free, wherein copying is allowable for the first generation, or wherein any copying is prohibited, 2-bit copy control information of "00". "10" or "11" is embedded in the information signal, respectively. However, in the case wherein any copying is prohibited, the copy control information is not embedded in the information signal.

When the information signal is copied on a recording medium, the copy control information embedded in the information signal according to the CDMS is detected, and then the copy control is performed in accordance with the detected copy control information. In this case, if any copy controlling signal is not detected, the information signal cannot be copied. This is because in the case wherein any copying is prohibited, any copy control information is not embedded.

As described above, control can be performed not only for copying-prohibition or copying-allowance, but also for copying-allowance only for the first generation. Thus, flexible copy preventing control has been able to be performed.

In the case wherein copy preventing control is performed according to the CGMS, however, suppliers of information signals have a desire that copying of the information signals is limited to copying by an individual, for example, at home, i.e., copying for private use even if the copy controlling information that copying is free or that copying is allowable for the first generation is added to the information signal.

In other words, there are no problems in the case wherein an individual copies the information signal on a recording medium at home and then the individual uses the copied information signal; however, it is not preferred for the suppliers of information signals that even information signals the copying of which is allowable are copied many times so that the copied information signals will spread widely to the public.

In order to prevent such spread of copied information signals, it is considered that the suppliers of information signals, in supplying the signals, more frequently add the copy control information that any copying is prohibited to the information signals for supply, or that the cost for supplying information signals becomes expensive. This case is not preferable since copying for private use is also limited.

SUMMARY OF THE INVENTION

In the light of the above, an object of the present invention is to provide an information signal recording/reproducing system and an information signal recording/reproducing process for making it possible to limit even the information signal the copying of which is allowable to be copied for private use; and recording and reproducing devices for use in this system and this method.

The present invention is an information signal recording/reproducing system, using a recording medium having thereon an area which is different from an area for recording information signals and which medium-related information, which is information on the recording medium, is beforehand recorded in, or having a section accompanying the recording medium in which the medium-related information is beforehand recorded; and comprising a recording device section for recording the information signals on the recording medium and a reproducing device section for reproducing the information signals recorded on the recording medium;

the recording device section comprising:
  recording-side medium-related information reading means for reading the medium-related information from the recording medium, or from the section accompanying the recording medium;
  information adding means for adding the medium-related information read by means of the recording-side medium-related information reading means to the information signals; and
  recording means for recording the information signals to which the medium-related information is added by means of the information adding means on the recording medium;
the reproducing device section comprising:
  reproducing-side medium-related information reading means for reading the recording medium, or from the section accompanying the recording medium;
  information signal reading means for reading the information signals from the recording medium;
  detecting means for detecting the medium-related information added to the information signals from the information signal reading means;

determining means for determining whether or not the medium-related information from the reproducing-side medium-related information reading means is consistent with the medium-related information from the detecting means; and reproduction controlling means for carrying out control for reproducing the information signals only when the medium-related information from the reproducing-side medium-related information reading means is consistent with the medium-related information from the detecting means.

According to the information signal recording/reproducing system of the present invention, when information signals attempt to be recorded, the medium-related information is read from the recording medium on which the information signals are recorded or from the section accompanying the recording medium by means of the recording-side medium-related information reading means. The read medium-related information is added to the information signals by means of the information adding means, and then the information signals to which the medium-related information is added are recorded on the recording medium. The medium-related information is, for example, information intrinsic to every recording medium, and is, in the case of the recording medium is a disc, a serial number recorded in a TOC (Table Of Content) of the disc.

When the information signals recorded on the recording medium are reproduced, the medium-related information of the recording medium is read from the recording medium to be reproduced or the section accompanying the recording medium by means of the reproducing-side medium-related information reading means. The medium-related information added to the information signals to be reproduced is detected by means of the detecting means.

The information signals are reproduced when the medium-related information read by means of the reproducing-side medium-related information reading means is consistent with the medium-related information detected from the information signals by means of the detecting means.

In short, when recording process is performed in an ordinary manner, the medium-related information added to the information signals is consistent with the medium-related information of the recording medium on which the information signals are recorded. However, when copying is carried out in other manner, for example, when the whole of the information recorded on the recording medium, as it is, is copied on another recording medium, the medium-related information of the recording medium is not consistent with the medium-related information of the information signals recorded on this.

Therefore, when the medium-related information added to the information signals is consistent with the medium-related information of the recording medium on which the information signals are recorded as described above, the information signals are decided to be information signals copied for private use in an ordinary manner and then are reproduced. On the contrary, when the medium-related information added to the information signals is not consistent with the medium-related information of the recording medium on which the information signals are recorded, the information signals are decided to be information signals copied in other manner than the ordinary manner and then are not reproduced.

Thus, the information signals copied in the ordinary manner by means of the recording device section can be reproduced without any problem. However, the information signals copied in other manner than the ordinary manner cannot be reproduced. Accordingly, it is possible to prevent copying of the information signals for other purposes than private use.

DETAILED DESCRIPTION OF THE PREFERRED EMBODIMENTS

Preferred embodiments of the present invention will be described below, referring to the attached drawings.

The First Embodiment

Figure 1:
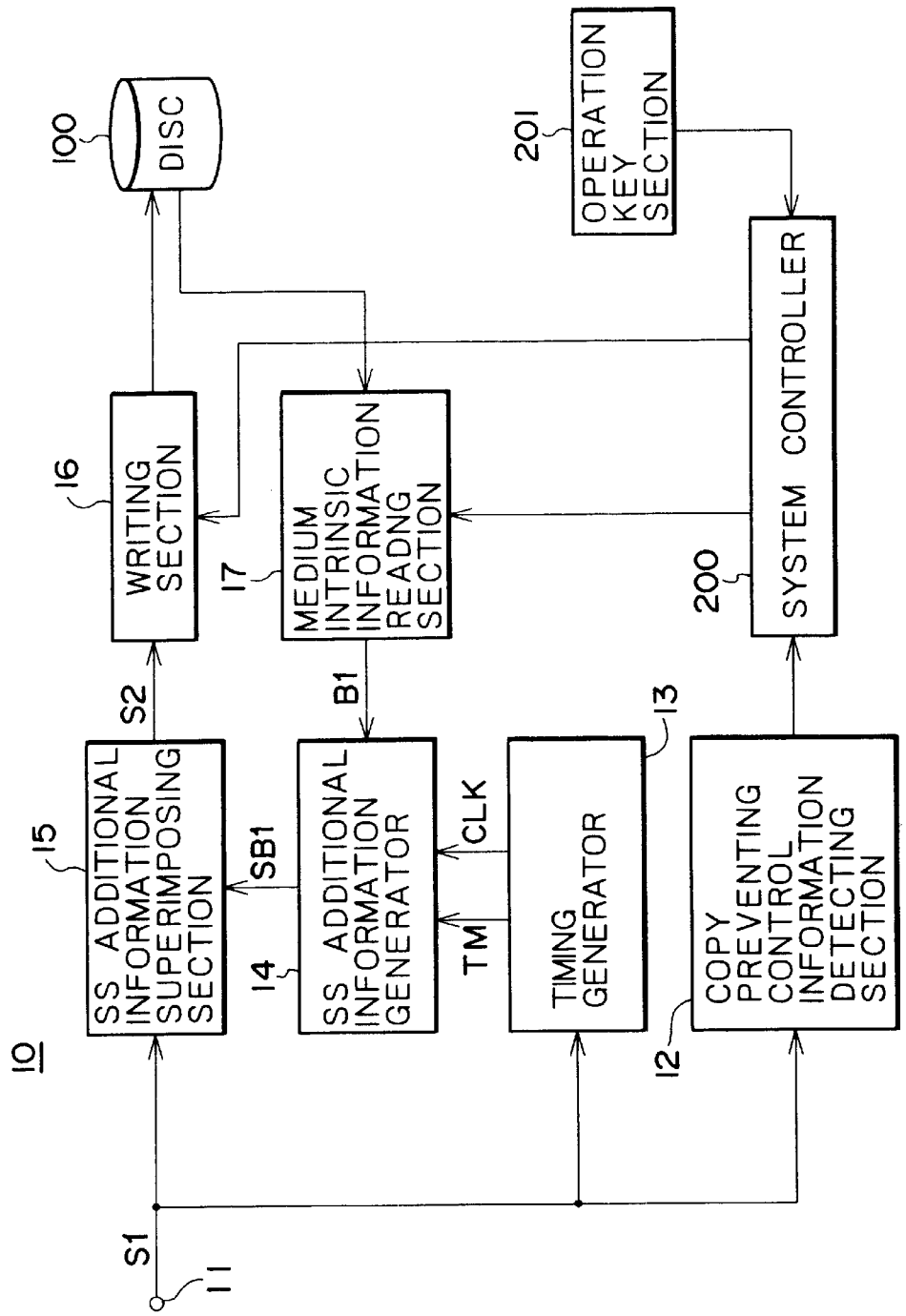
FIG. 1 is a block diagram for explaining an embodiment of the information signal recording device according to the present invention.

In the first embodiment, an information signal recording device 10, which is referred to as a recording device hereinafter, shown in FIG. 1 is a device for receiving digital information signals provided through a network such as Internet and then recording them on a recording medium.

Figure 6:
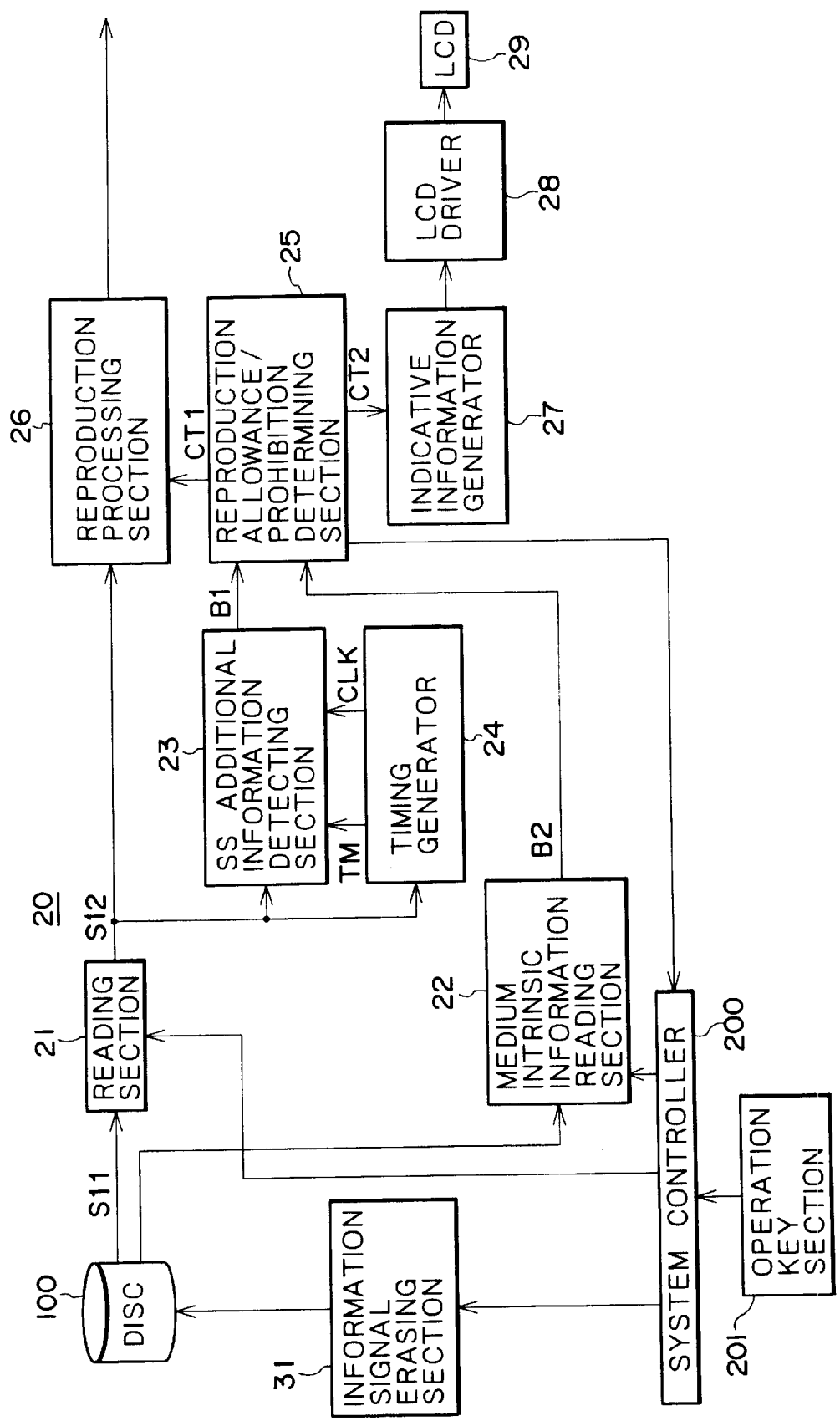
FIG. 6 is a block diagram for explaining an embodiment of the information signal reproducing device according to the present invention.

An information signal reproducing device 20, which is referred to as a reproducing device hereinafter, shown in FIG. 6 is a device for reproducing information signals recorded on the recording medium and, for example, displaying reproduced images on a display or transmitting them to other communication devices through a network such as Internet.

In short, the recording device 10 and the reproducing device 20 are devices such as a personal computer which can transmit and receive information signals through a network such as Internet, and the recording device 10 corresponds to a recording system in a device such as a personal computer, and the reproducing device 20 corresponds to a reproducing system in the same device.

When information signals are recorded on a recording medium, information intrinsic to the individual medium (medium intrinsic information) is added, as information related to the recording medium on which the information signals are to be recorded, to the information signals and then the resultant information signals are recorded on the recording medium, which will be in detail described later. In the case wherein the information signals recorded on the recording medium attempt to be reproduced, the signals are reproduced only when the aforementioned medium intrinsic information added to the information signals to be reproduced is consistent with the medium intrinsic information which the recording medium on which the information signals to be reproduced are recorded has.

In other words, when an individual user uses the recording device 10 which will be explained below so as to copy the information signals in an ordinary manner for private use, the medium intrinsic information added to the copied information signals will be made consistent with the medium intrinsic information which the recording medium on which the information signals are recorded has.

In the case wherein for every recording medium on which the information signals are to be recorded the medium intrinsic information of the medium is not added to the information signals to be recorded, but in the case wherein the same information signals are copied on many recording media, for example, by copying the information signals recorded on a single recording medium onto other recording media, the medium intrinsic information which is added to the information signals and which will be consistent in the case of copying in an ordinary manner is not consistent with the medium intrinsic information which the recording medium on which the information signals are recorded has. In this case, therefore, reproduction is prohibited, and illegally copying of the information signals in a manner different from the ordinary manner is prohibited.

Recording Device 10

The recording device 10 in the first embodiment will be firstly described.

FIG. 1 is a block diagram for explaining the recording device 10 in the first embodiment. As shown in FIG. 1, the recording device 10 has an input terminal 11 for inputting information signals, a copy preventing control information-detecting section 12, a timing generator 13, an SS additional information generator 14 (The SS is an abbreviation of spread spectrum, which is the same hereinafter.), an SS additional information superimposing section 15, a writing section 16, a medium intrinsic information reading section 17, and a system controller 200 for controlling the respective sections in the recording device 10.

A recording medium 100 is a medium on which various digital information signals such as digital image signals, digital sound signals and programs are recorded by this recording device 10, including discs such as a CD-ROM and a DVD. In the following, for simplifying explanation information signals which are supplied to the recording device 10 through the input terminal 11 for inputting information signals and are recorded on the disc 100 are digital image signals.

The digital image signals S1 supplied to the recording device 10 are signals to which copy preventing control information called CGMS (copy generation management system) is inserted and added. The copy preventing control information called the CGMS is, for example, 2-bit information representing the content of copy control for the digital image signals S1, such as allowance of copying, prohibition of copying, or copying generation restriction.

When the disc 100 for recording information signals is set into the recording device 10 and a user gives an instruction for starting record of image signals through an operation key section 201 connected to the system controller 200, the controller 200 controls the respective sections in the recording device 100 so as to start the recording process for recording the supplied information signals onto the disc 10.

Digital image signals S1 transmitted from a network such as Internet and received by the recording device 10 are supplied to the copy preventing control information detecting section 12, the timing generator 13 and the SS additional information superimposing section 15 in the recording device 100.

The copy preventing control information detecting section 12 detects the copy preventing control information according to the CGMS which is added to the supplied digital image signals S1, and then communicates the detected copy preventing control information to the system controller 200.

When the information from the copy preventing control information detecting section 12 shows that any copying is prohibited, the system controller 200 controls the respective sections not to record the digital image signals S1. When the information from the copy preventing control information detecting section 12 shows that copying is allowable, the system controller 200 controls the respective sections in the device 10 to record the digital image signals S1 on the recording medium 100.

When the digital image signals S1 can be copied, the medium intrinsic information reading section 17 reads a serial number intrinsic to every disc recorded in, for example, a TOC (Table Of Contents) of the disc 100, and supplies this as medium intrinsic information B1 to the SS additional information generator 14.

The reference timing generator 13 detects reference timing signals from the supplied digital image signals S1 and then generates timing signals TM and clock signals CLK used in the respective sections in the recording device 100 on the basis of the detected reference timing signals.

Figure 2:
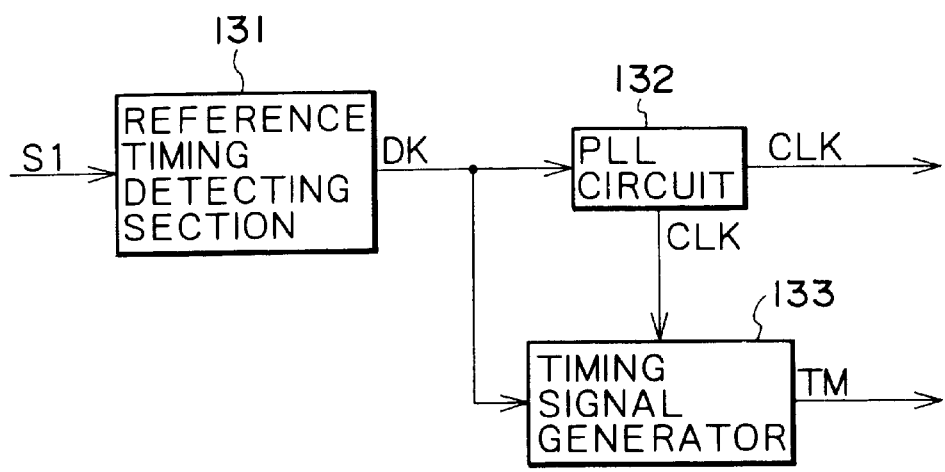
FIG. 2 is a block diagram for explaining a timing generator in the recording device shown in FIG. 1.

FIG. 2 is a block diagram for explaining the timing generator 13 in the recording device 10. As shown in FIG. 2, the timing generator 13 has a reference timing detecting section 131, a PLL circuit 132 and a timing signal generator 133.

The timing detecting section 131 extracts synchronous signals DK as the reference timing signals from the digital image signals S1 supplied to the section 131, and then supplies the signals to the PLL circuit 132 and the timing signal generator 133.

The PLL circuit 132 generates clock signals CLK synchronized with the digital image signals S1 on the basis of the synchronous signals DK from the reference timing detecting section 131. The clock signals CLK are supplied not only to the timing signal generator 133 but also to the respective sections using the clock signals CLK such as the SS additional information generator 14 which will be in detail described later.

The timing signal generator 133 generates timing signals TM for use in the SS additional information generator 14 and other various timing signals on the basis of the synchronous signals DK from the reference timing detecting section 131 and the clock signals CLK from the PLL circuit 131.

The timing signals TM generated in the timing signal generator 133 are synchronized with the synchronous DS from the reference timing detecting section 131, and are used as reset (initializing) signals for taking timing for generating a PN code series having a predetermined code pattern used for spectrum-spreading from the head of the code series, in the SS additional information generator 14.

When, for example, vertical synchronizing signals are extracted as reference timing signals in the reference timing detecting section 131 in the timing generator 13, the clock signals CLK synchronized with the vertical synchronizing signals from the reference timing detecting section 131 are generated in the PLL circuit 132.

In the timing signal generator 133, on the basis of the vertical synchronizing signals from the reference timing detecting section 131 and the clock signals CLK from the PLL circuit 132, timing signals TM synchronized with the vertical synchronizing signals used as reference timing signals are generated, so as to make one field correspond to one cycle.

As shown in FIG. 1, the timing signals TM and the clock signals CLK thus generated in the timing generator 13 are supplied to the SS additional information generator 14.

The SS additional information generator 14 receives the supply of the medium intrinsic information B1, the timing signals TM and the clock signals CLK and then generates SS medium intrinsic information (SS additional information) SB1, which is a spread spectrum signal of the medium intrinsic information B1.

Figure 3:
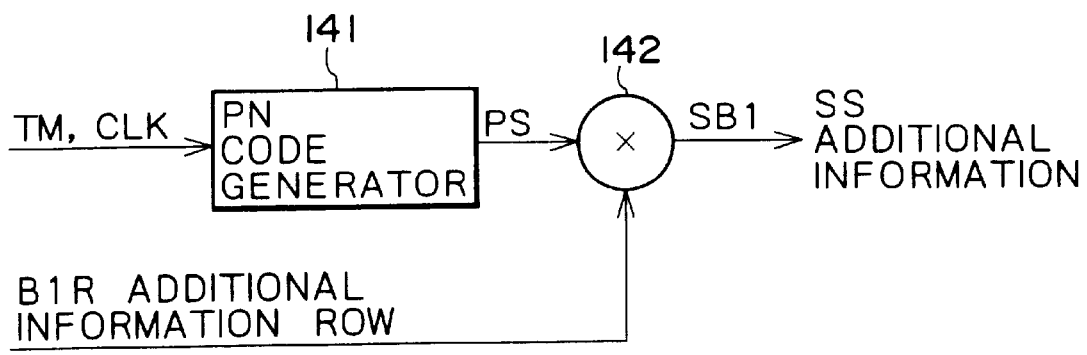
FIG. 3 is a block diagram for explaining an SS additional information generator in the recording device shown in FIG. 1.

FIG. 3 is a block diagram for explaining the SS additional information generator 14. As shown in FIG. 3, the SS additional information generator 14 comprises a PN (Pseudorandam Noise) code generator 141 and a multiplier 142.

The PN code generator 141 generates a PN code series PS, on the basis of the timing signals TM and the clock signal as CLK. Specifically, at every timing that the timing signal TM is supplied, the PN code generator 141 generates the PN code series PS from its head, in synchronization with the clock signals CLK, and then supplies this to the multifier 142.

Into the multifier 142, supplied are medium intrinsic information rows B1R which are generated by outputting medium intrinsic information B1 from the medium intrinsic information reading section 12 in such a manner that bits corresponding to the predetermined number of clocks are outputted in synchronization with the clock signals CLK at every timing given by the timing signal TM.

In the multifier 142, the PN code series PS are multiplied by the medium intrinsic information rows B1R, so as to generate spread spectrum signals (SS medium intrinsic information), which are spectrum-spread medium intrinsic information.

As described above, the SS additional information generator 14 has a function as a spreading means for making medium intrinsic information B1 having a narrow band and a high level into SS medium intrinsic information SB1 having a wide and a low lever by using the PN code series PS to spectrum-spread the medium intrinsic information B1. This will be in detail described later.

Figure 4:
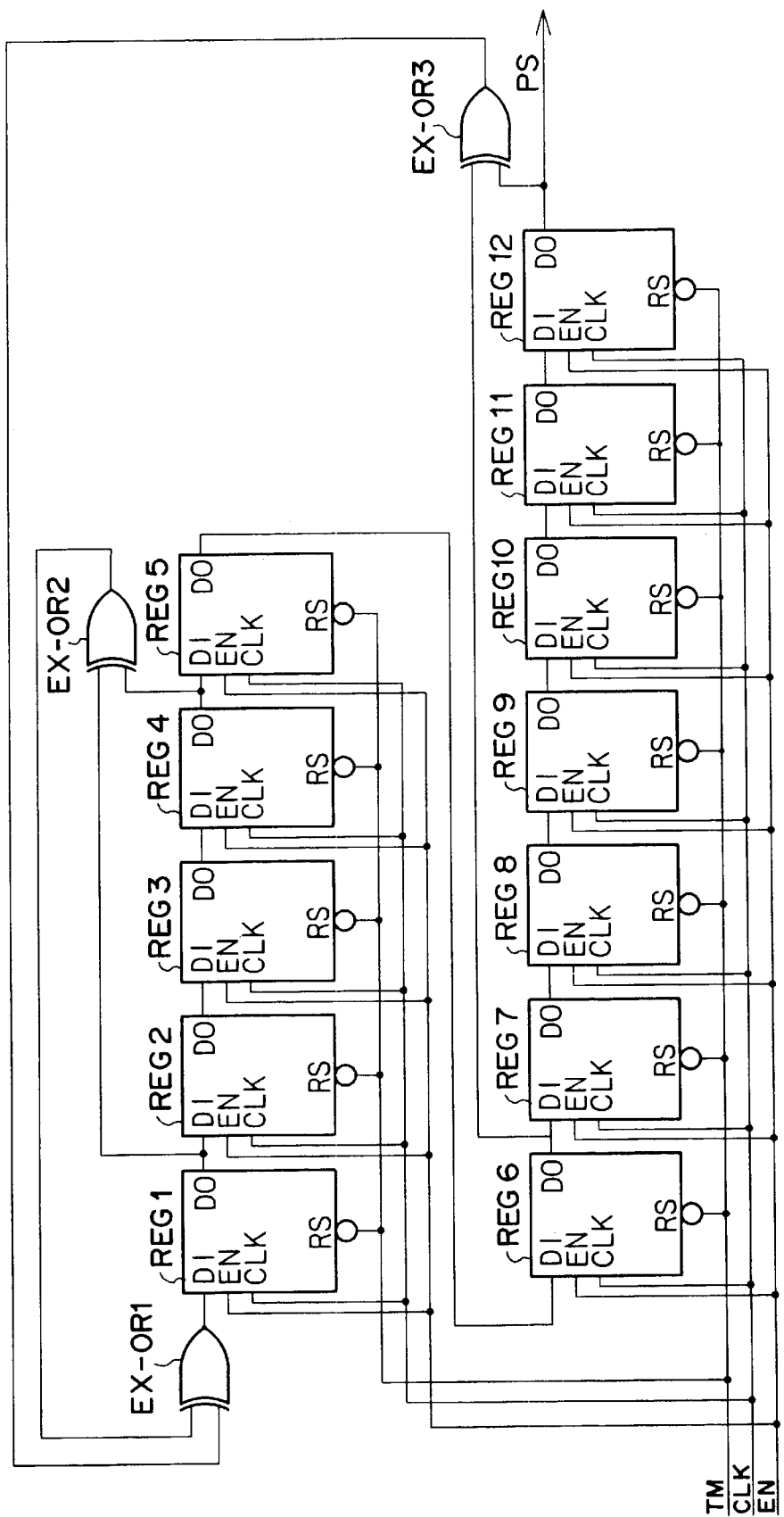
FIG. 4 is a block diagram for explaining an example of a PN code generator in a portion in the device shown in FIG. 1.

FIG. 4 is a view illustrating a structural example of the PN code generator 141 shown in FIG. 3. The PN code generator 141 of this example comprises D flip-flop circuits REG1–REG12 constituting 12 steps of sift resistors, and Exclusive-OR circuits EX-OR1–EX-OR3 for calculating appropriate tap outputs from the sift resistors. The PN code generator 141 shown in FIG. 4 generates PN code series PS in the M (Maximum) length sequence on the basis of the timing signals TM and the clock signals CLK, as described above.

Enable signals EN in FIG. 4 are signals for falling the PN cord generator 141 into an operating state. In the first embodiment, the enable signals are generated, for example, by switching on the recording device 10 shown in FIG. 1, and then supplied to the PN cord generator 141.

The SS medium intrinsic information SB1 thus obtained from the SS additional information generator 14 is supplied to the SS additional information superimposing section 15.

The signal superimposing section 15 receives the supply of the digital image signals S1 and the digital SS medium intrinsic information SB1, and then generates digital image signals S2 on which the SS medium intrinsic information SB1 as a digital signal is superimposed.

When the digital image signals S1 are composed of, for example, a 10 bit-source, in which an image of 1 pixel is represented by 10-bit signals, the SS medium intrinsic information SB1 is superimposed on the least significant bit (LSD) in the 10-bit digital image signals, or the ninth bit adjacent to the LSD in the SS additional information superimposing section 15. In this manner, the SS additional information superimposing section 15 causes the SS medium intrinsic information SB1 to be superimposed on the digital image signal S1 within the same time and the same frequency.

In this case, the SS additional information superimposing section 15 causes the SS medium intrinsic information SB1 to be superimposed on the digital image signals S1 at a lower signal electric power than the dynamic range of the digital image signals S1, so that the digital image signals S1 will not be deteriorated by the SS medium intrinsic information SB1. The digital image signals S2 thus formed by superimposing the SS medium intrinsic information SB1 on the digital image signals S1 in the SS additional information superimposing section 15 are supplied to the writing section 16.

The writing section 16 receives the supply of the digital image signals S2 on which the digital SS medium intrinsic information SB1 is superimposed, converts this into digital image signals suitable for writing, and then permits the digital image signals for writing to be recorded on the recording medium 100.

As will be in detail described below, the SS medium intrinsic information SB1 superimposed on the digital image signals recorded on the recording medium 100 is spectrum-spread, and consequently reproduction images based on the digital image signals are not deteriorated, and not altered nor erased.

Figure 5A:
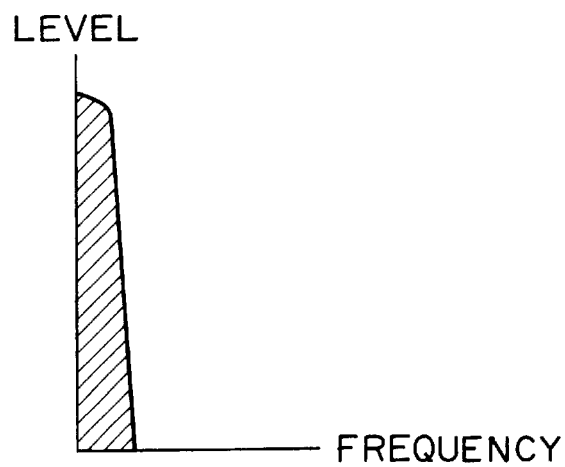
FIGS. 5A to 5D are diagrams showing relationships between the SS additional information and information signals.
Figure 5B:
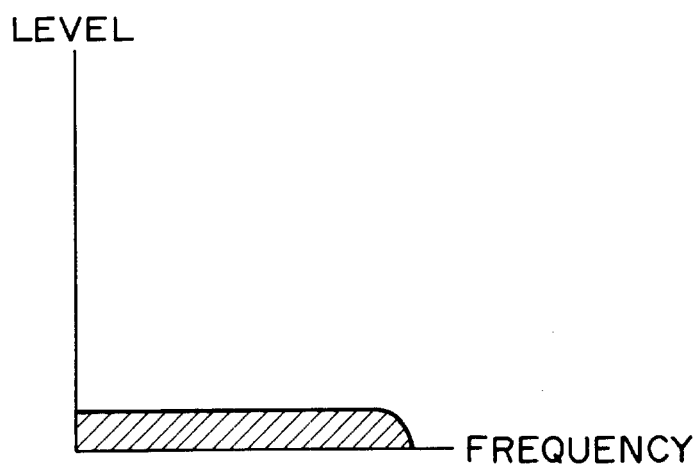

FIGS. 5A to 5D are diagrams of spectrums showing the relationship between information signals, in particular image signals in the present example, and additional information, such as medium intrinsic information, added to the information signals. The additional information includes a small deal of information, and is low-bit information and narrow band-information as shown in FIG. 5A. This is subjected to spectrum-spreading, resulting in wide band-information as shown in FIG. 5B. At this time, the spectrum-spread signal level becomes lower in inverse proportion to the expansion rate of the band.

Figure 5C:
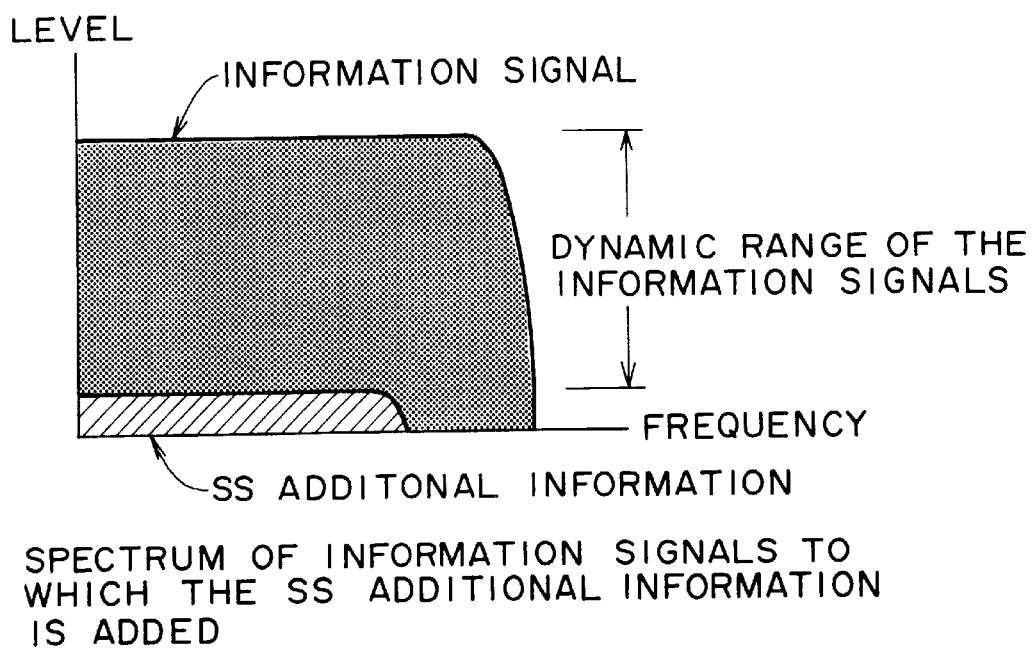

These spread spectrum signals, that is, pieces of the SS medium intrinsic information SB1, are superimposed on the information signals on the SS additional information superimposing section 15. In this case, as shown in FIG. 5C, the SS medium intrinsic information SB1 is superimposed at a level lower than the dynamic range of the image signals as the information signals. By such superimposing, the information signals are hardly deteriorated. Thus, when the image signals on which the SS medium intrinsic information SB1 is superimposed are supplied to a monitoring device, good images are reproduced without substantial influence of the SS medium intrinsic information SB1.

Figure 5D:
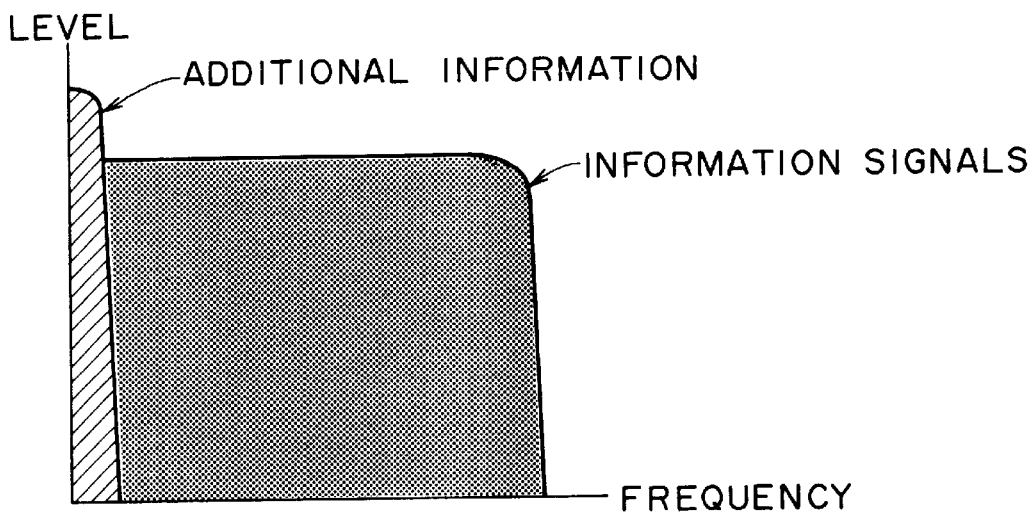

However, when inverse spectrum-spreading is performed in such a manner as will be in detail described later so as to detect the SS medium intrinsic information SB1 as additional information at a recording side, the SS medium intrinsic information SB1 is again restored to a narrow band signal (additional information) as shown in FIG. 5D. By giving a sufficient band spreading rate, the electric power of the copy control information after being inverse-spread-spread becomes more than that of the information signals, so that the SB1 can be detected.

In this case, the SS medium intrinsic information SB1 superimposed on the image signals cannot be erased nor altered by any frequency filter or simple replacement of information, since the information SB1 is superimposed within the same time and frequency as those of the image signals.

As described above, the SS medium intrinsic information SB1 superimposed on the digital image signals is spectrum-spread and superimposed as wide band and low level signals, and consequently the information SB1 does not cause image signals reproduced from the digital image signals to be deteriorated.

Since the SS medium intrinsic information SB1 is superimposed on the digital image signals within the same time and frequency, the newly additional image signals cannot be erased nor altered by any frequency filter or replacement of information signals.

As described above, the spectrum-spread medium intrinsic information is superimposed on the digital image signals within the same time and frequency; therefore, even if the digital image signals on which the spectrum-spread additional information is superimposed are D/A-converted into analog signals, they are never erased.

When the supplied digital signals are recorded on the disc in the recording device 10, a serial number which is recorded on the TOC and which is information intrinsic for every disc is spectrum-spread as medium intrinsic information and then this is superimposed on the digital image signals S1 to be recorded, as described above. The digital image signals S2 on which the spectrum-spread medium intrinsic information is superimposed are recorded on the disc 100.

In short, the recording device 10 in the present embodiment makes it possible to spectrum-spread the medium intrinsic information, superimpose it on the digital image signals to be recorded on the disc 100, and then record it on the recording medium, without the digital image signals recorded on the disc 100 being deteriorated nor the medium intrinsic information superimposed on the digital image signals being altered.

When this recording device 10 is used to record the information signals in an ordinary manner, the spectrum-spread medium intrinsic information for superimposition on the image signals is made consistent with the medium intrinsic information of the recording medium on which the image signals are to be recorded.

Reproducing Device 20

The following will describe the reproducing device 20.

FIG. 6 is a block diagram for explaining the reproducing device 20. As shown in FIG. 6, the reproducing device 20 has a reading section 21, a medium intrinsic information reading section 22, an SS additional information detecting section 23, a timing generator 24, a reproduction allowance/prohibition determining section 25, a reproduction processing section 26, an indicative information generator 27, an LCD (Liquid Crystal Display) driver 28, an LCD 29, an information signal erasing section 31, and a system controller for controlling the respective sections in the producing device 20.

The reproducing device 20 is a device for reproducing and outputting the digital image signals recorded on the disc 100 by the aforementioned recording device 10. Namely, the reproducing device 20 is a device for reproducing the digital image signals on which the spectrum-spread medium intrinsic information is superimposed.

When an instruction is given for starting reproducing the image signals recorded on the disc 100 set by a user through an operation they section 201 connected to the system controller 200 in the reproducing device 20, the system controller 200 controls the respective sections in the reproducing device 20 so as to start reproducing process.

The reading section 21 in the reproducing device 20 generates digital regenerative image signals S12 from signals S11 obtained by reproducing the information signals recorded on the disc 100, and then supplies them to the SS additional information detecting section 23, the timing generator 24 and the reproduction processing section 26.

The timing generator 24 has the same structure as the aforementioned timing generator 13, referring to FIG. 2, and generates timing signals TM and clock signals CLK for use in the respective sections in the reproducing device 20. Therefore, the timing generator 24 will be described, as the structure shown in FIG. 2.

The reference timing detecting section 131 in the timing generator 24 extracts synchronous signals DK as reference timing signals from the digital image signals S12 supplied to the section 131. The synchronous signals DK are supplied to the PLL circuit 132 and the timing signal generator 133.

The PLL circuit 132 generates clock signals CLK synchronized with the digital image signals S12, on the basis of the synchronous signals DK from the reference timing detecting section 131, and supplies them to the respective sections, for example, the timing signal generator 133 and the SS additional information detecting section 23 which will be in detail described later.

The timing signal generator 133 generates and outputs timing signals TM and other various timing signals for use in the respective sections, for example, the SS additional information reading section 22 and the SS additional information generator 25, on the basis of the synchronous signals DK from the reference timing detecting section 131 and the clock signals CLK from the PLL circuit 132.

In the reproducing device 20, the timing signals TM and the clock signals CLK give the same timing as the timing signals TM and the clock signals CLK used in the aforementioned recording device 10.

As shown in FIG. 6, the timing signals TM and the clock signals CLK thus generated in the timing generator 24 are supplied to the SS additional information detecting section 23.

The SS additional information detecting section 23 carries out inverse spectrum-spreading to extract the medium intrinsic information B1 which is spectrum-spread and superimposed on the digital regenerative image signals S12, and then supplies this to the reproduction allowance/prohibition determining section 25.

Specifically, the SS additional information detecting section 23 has a PN code generator and a multiplier not illustrated, and generates a PN code series for inverse-spreading having the same code patter as the PN code series for spectrum-spreading the medium intrinsic information B1 which is spectrum-spread and superimposed on the digital image signals S12, with their generating timing being consistent, on the basis of the timing signals TM and the clock signals CLK from the aforementioned timing generator 24. The section 23 carries out the inverse spectrum-spreading by using the PN code series for inverse-spreading so that the medium intrinsic information B1 superimposed on the digital regenerative signal component S12 will be extracted from the signal component S12.

On the contrary, the medium intrinsic information reading section 22 reads the serial number of the disc 100 recorded in the TOC of the disc 100 as medium intrinsic information, in the same manner as the medium intrinsic information reading section 17 in the recording device 10, and then supplies this to the reproduction allowance/prohibition determining section 25 as the medium intrinsic information B2 of the recording medium on which the digital image signals to be reproduced are recorded.

The reproduction allowance/prohibition determining section 25 determines whether or not the medium intrinsic information B1 superimposed on the digital image signals which are read from the disc 100 and supplied from the SS additional information detecting section 23 is consistent with the medium intrinsic information B2 of the disc 100 which is read by the medium intrinsic information reading section 22, and then generates a control signal CT1 or CT2 according to the determination to supply it to the reproduction processing section 25 and the indicative information generator 27.

In other words, when the medium intrinsic information B1 from the SS additional information detecting section 23 is consistent with the medium intrinsic information B2 from the medium intrinsic information reading section 22, the reproduction allowance/prohibition determining section 25 concludes that the image signals recorded on the disc 100 are signals properly copied in an ordinary manner, and then generates the control signal CT1 for allowance of reproduction so as to supply this to the reproduction processing section 26.

When the control signal CT1 from the reproduction allowance/prohibition determining section 25 is a signal for allowance of reproduction, the reproduction processing section 26 performs a process for encoding the digital image signals and the like processes to generate and output regenerative image signals.

When the reproduction allowance/prohibition determining section 25 determines that the medium intrinsic information B1 from the SS additional information detecting section 23 is not consistent with the medium intrinsic information B2 from the medium intrinsic information reading section 22, the reproduction allowance/prohibition determining section 25 concludes that the image signals recorded on the disc 100 are not signals properly copied, and then generates the control signal CT1 for prohibiting reproduction and supplies this to reproduction processing section 26. At the same time, the section 25 generates a control signal CT2 for displaying the fact that the digital signals recorded on the recording medium 100 cannot be reproduced on the LCD 29 and then supplies this to the indicative information generator 27.

In this case, the reproduction processing section 26 does not permit the digital image signals S12 to be reproduced. The indicative information generator 27 receiving the supply of the control CT2 generates message information that the image signals recorded on the recording medium 100 may not be signals copied in an ordinary manner and they cannot be reproduced, so as to display this on the LCD 29 through the LCD driver 28.

Furthermore, in this case, the reproduction allowance/prohibition determining section 25 informs the system controller 200 that the medium intrinsic information B1 from the SS additional information detecting section 23 is not consistent with the medium intrinsic information B2 from the medium intrinsic information reading section 22. After receiving this information, the system controller 200 controls the information signal erasing section 31 to erase the information signals recorded on the recording medium 100.

The information erasing section 31 makes it impossible to read the image signals on which the medium intrinsic information different from the medium intrinsic information of the disc 100 is superimposed. That is, this section 31 is a section for carrying out a so-called logically erasing.

Of course, it is possible to initialize the disc 100 so as to erase the whole of the information signals recorded on the disc 100, or to physically erase the image signals on which the medium intrinsic information different from the medium intrinsic information of the disc 100 is superimposed.

Figure 7:
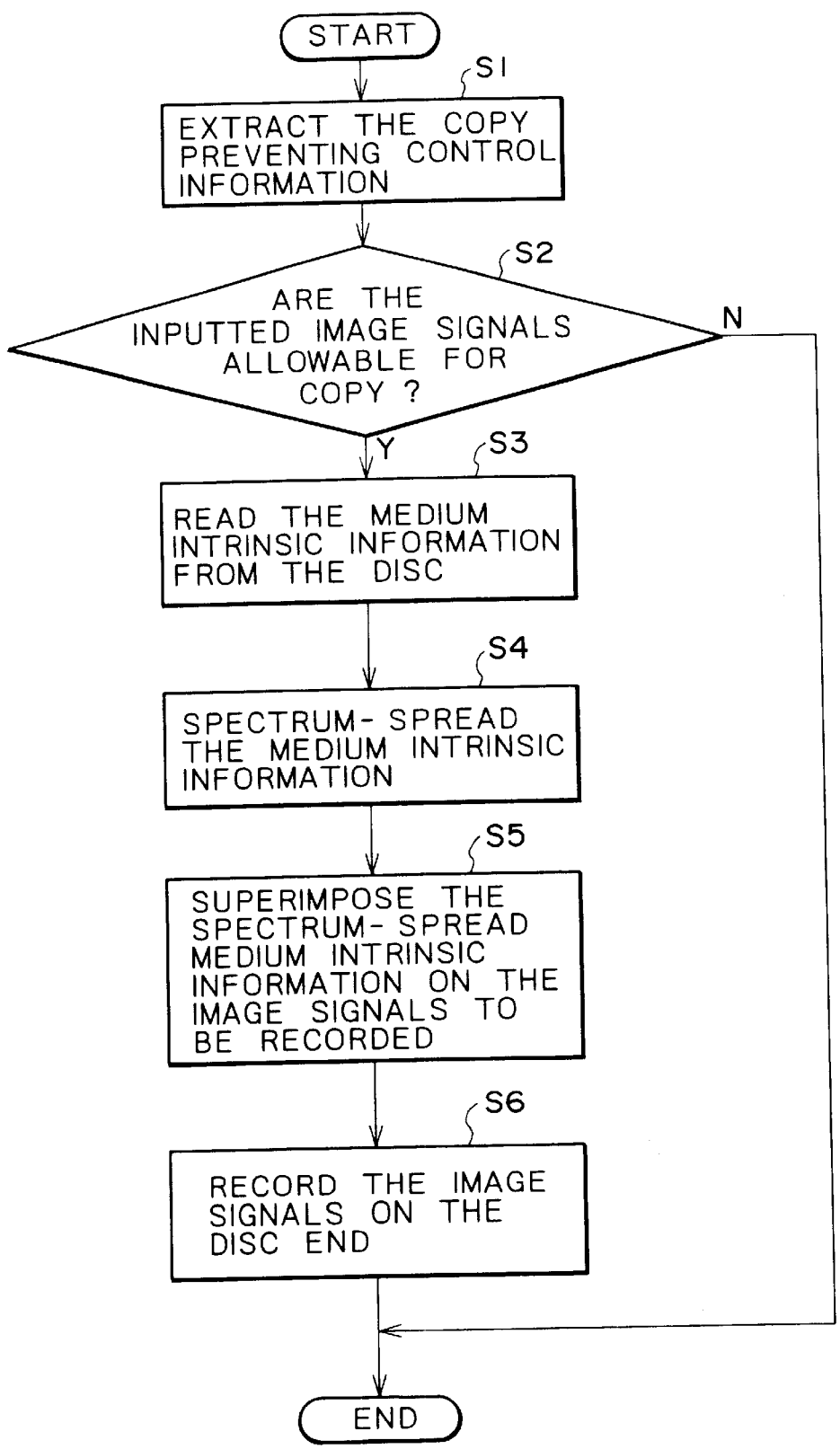
FIG. 7 is a flowchart for explaining the flow of the action of the recording device shown in FIG. 1.
Figure 8:
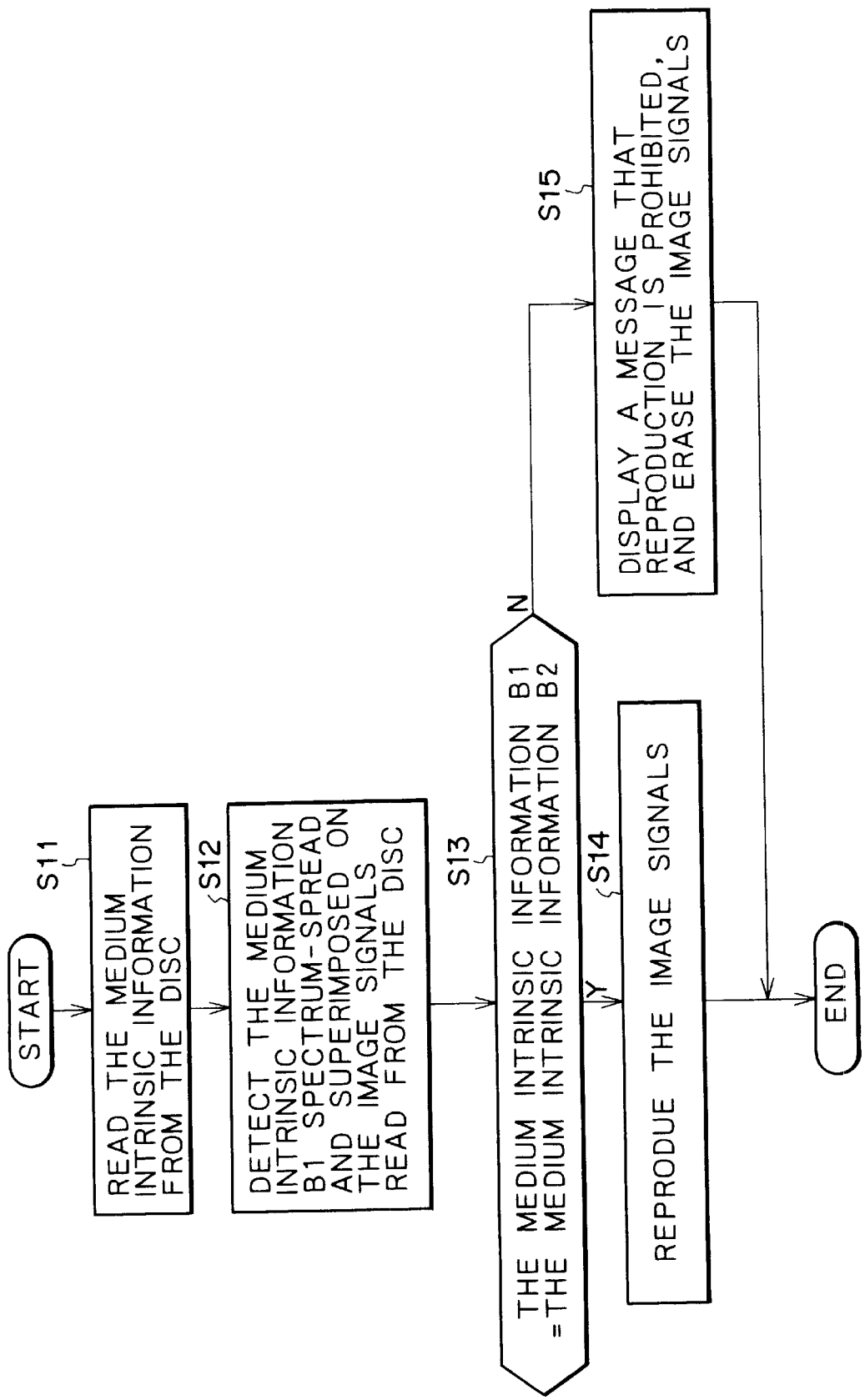
FIG. 8 is a flowchart for explaining the flow of the action of the reproducing device shown in FIG. 6.

Action of the recording device 10 and the reproducing device 20:

The following will describe the flow of action of the aforementioned recording device 10 and the reproducing device 20, referring to flowcharts shown in FIGS. 7 and 8.

FIG. 7 is a flowchart for explaining the flow of the action of the recording device 10. The process shown in FIG. 7 is started when, for example, a user of the recording device 10 carries out the operation for recording the digital image signals inputted from the inputting terminal for inputting information signals.

The recording device 10 firstly extracts, from the image signals supplied through the inputting terminal 11, the copy preventing control information which is added to the image signals (step S1), and determines whether or not the supplied image signals can be copied (step S2). When in the determining step S2 the copy preventing control information indicates that copying is prohibited, this process is finished without any copying being carried out.

When in the determining step S2 the extracted copy preventing control information indicates that copying of the supplied information signals is allowable, or allowable for only first generation, the serial number recorded in the TOC of the disc 100 on which the image signals are to be recorded is read as the medium intrinsic information (step S3), and the read medium intrinsic information is spectrum-spread (step S4).

The spectrum-spread medium intrinsic information SB1 is then superimposed on the image signals recorded on the disc 100 (step S5), and the image signals on which the spectrum-spread medium intrinsic information SB1 is superimposed are recorded on the disc 100.

FIG. 8 is a flowchart for explaining the flow of the action of the reproducing device 20. The process shown in FIG. 8 is started when, for example, a user of the reproducing device 20 carries out the operation for instructing reproduction of the image signals recorded on the disc 100 set into the reproducing device 20.

The reproducing device 20 firstly reads the serial number recorded in the TOC of the disc 100 on which the image signals to be reproduced are recorded, as the medium intrinsic information B2, from this disc 100 (step S11). The device 20 then detects the medium intrinsic information B1 spectrum-spread and superimposed on the image signals read from the disc by inverse spectrum-spreading (step S12), and determines whether or not the read medium intrinsic information B2 is consistent with the medium intrinsic information B1 superimposed on the image signals (step S13).

When in the determining step S13 it is determined that the medium intrinsic information B1 is consistent with the medium intrinsic information B2, the reproducing device 20 performs reproduction of the image signals and reproduces the image signals recorded on the disc 100 (step S14).

When in the determining step S13 it is determined that the medium intrinsic information B1 is not consistent with the medium intrinsic information B2, the reproducing device 20 concludes that the image signals copied on the disc 100 are not signals copied in an ordinary manner so that the device 20 does not perform reproduction of the image signals and further displays a message that the image signals recorded on the disc cannot be reproduced on the LCD. The device 20 then erases the image signals on which the medium intrinsic information B1 different from the medium intrinsic information B2 recorded on the disc 100 (step S15) is superimposed.

As described above, when the individual user uses the recording device 10 to record information signals, such as image signals, which are allowable for copying in an ordinary manner for private use, the medium intrinsic information B1 superimposed on the information signals recorded on the disc is consistent with the medium intrinsic information which the disc on which the information signals are recorded has. However, when the information signals recorded on the disc are not signals copied in an ordinary manner in the recording device 10, the medium intrinsic information superimposed on the information signals recorded on the disc is not consistent with the medium intrinsic information which the recording disc on which the information signals are recorded has. Thus, in the reproducing device 20 reproduction is not carried out.

Thus, even if the information signals are allowable for copying, normal reproduction can be carried out when the signals are copied in an ordinary manner for private use of a user, and further illegal copying in a manner different from the ordinary manner can be prevented.

The medium intrinsic information superimposed on information signals when they are recorded is spectrum-spread and superimposed on the information signals; therefore, the information signals are not deteriorated and further it is also possible to surely pick up the medium intrinsic information properly superimposed and spectrum-spread, without this medium intrinsic information being altered nor taken off, and carry out collation of the two pieces of the medium intrinsic information in the manner as described above.

When the medium intrinsic information superimposed on the information signals recorded on the disc is not consistent with the medium intrinsic information of the disc on which these information signals are recorded, the LCD 29 displays the message that the signals cannot be reproduced. However, the invention is not limited to such an embodiment.

For example, an LED (Light Emitting Diode) and an LED driver are disposed to inform that image signals cannot be reproduced, and the LED may be turned on, or turned on and off when image signals as information signals cannot be reproduced because of inconsistency with the aforementioned two pieces of medium intrinsic information.

An OSD (On Screen Display) may be used to generate a signal for displaying a message that image signals to be reproduced cannot be reproduced, instead of the image signals to be reproduced, and output it.

Of course, superimposing may be used to display a message that normal reproduction cannot be carried out because of inconsistency with the aforementioned two pieces of medium intrinsic information in images based on the image signals to be reproduced. In this case, the message may be displayed to conceal a half or more of the area of the image based on the image signal to be reproduced, so that what the image to be watched is can be understood and at the same time the image signal cannot be normally reproduced because of concealment of the image caused by displaying the message.

When the medium intrinsic information superimposed on the information signals recorded on the disc is not consistent with the medium intrinsic information of the disc on which these information signals are recorded, a sound warning may be given.

In the first embodiment, the image signals on which the medium intrinsic information different from the medium intrinsic information of the disc 100, which is recorded on the disc 100, is superimposed are erased. In this case, however, it is not necessarily erased because the image signals are not reproduced.

The Second Embodiment

As will be in detail described later, when information signals are recorded on a recording medium according to the second embodiment, device intrinsic information which is intrinsic to a recording device for recording is added, as information related to the recording device, to the information signals, and then the resultant signals are recorded on a recording medium. As the device intrinsic information, for example, manufacturer's serial number may be used. In the case wherein the information signals recorded on the recording medium are reproduced, the information signals recorded on the recording medium may be reproduced when the device intrinsic information added to the information signals to be reproduced is consistent with the device intrinsic information which a reproducing device for reproducing these information signals has.

In other words, the second embodiment makes it possible to reproduce information signals only in a recording/reproducing device by which the information signals were recorded, and to copy the information signals only for private use, which is more restrictive for copying than the first embodiment using medium intrinsic information.

In the second embodiment, a recording device 30 or a reproducing device which will be in detail described below is a device such as a personal computer which can receive and transmit information signals through a network such as Internet, in the same manner as in the first embodiment. The recording device 30 and the reproducing device 40 correspond to a recording system in a device, such as a personal computer, and a reproducing system in the same device, respectively.

Therefore, in the recording and reproducing devices 30 and 40 according to the second embodiment, the same reference numbers are attached to the same structures/elements as in the recording and reproducing devices 10 and 20 according to the first embodiment, and the explanation thereof will be made simple. In the same manner as in the first embodiment, a recording disc 100 is a disc such as a CD-ROM or a DVD, and information signals to be recorded and reproduced will be described as digital image signals.

Recording Device 30

Figure 9:
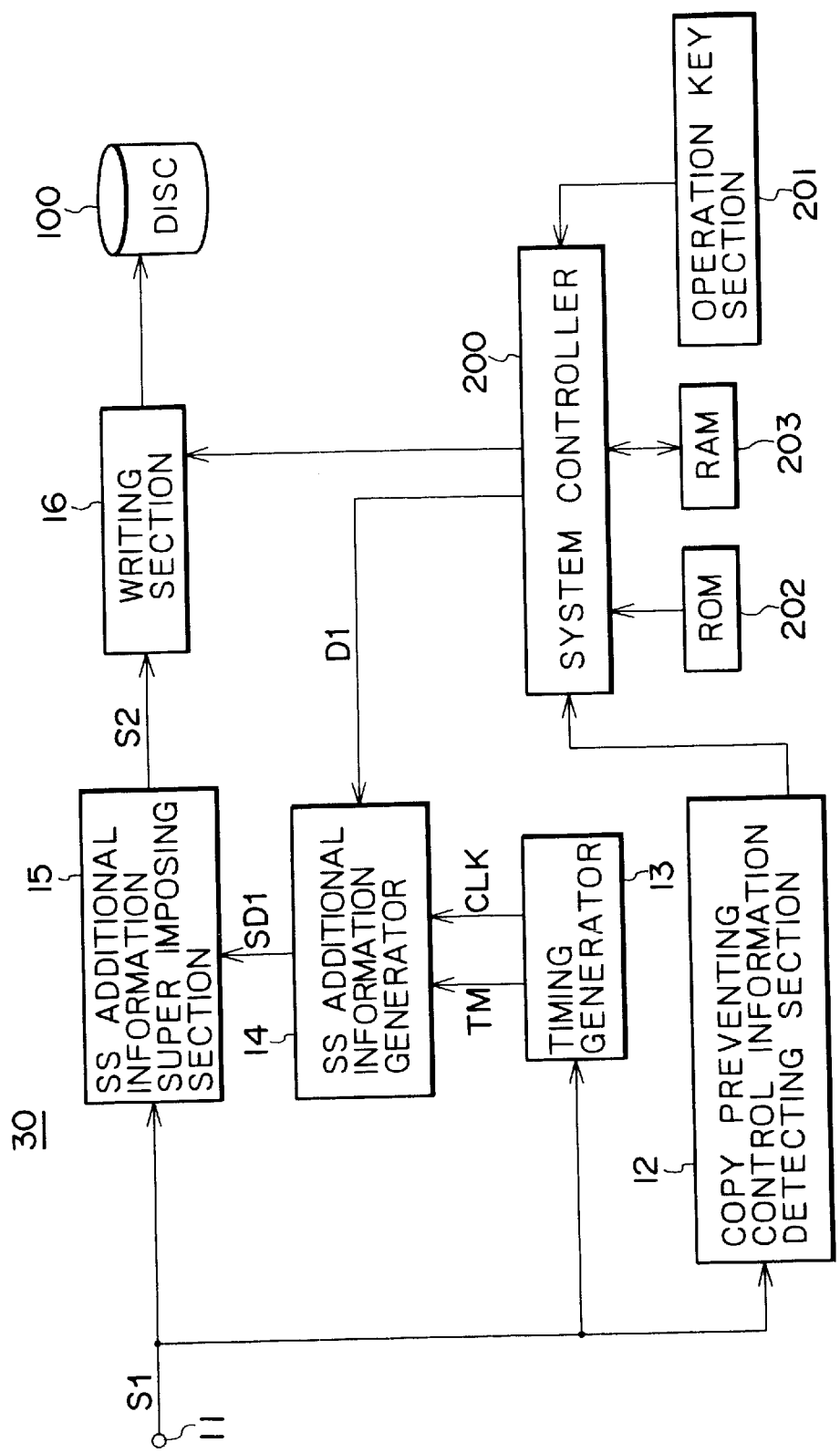
FIG. 9 is a block diagram for explaining other embodiment (using device intrinsic information) of the information signal recording device according to the invention.

FIG. 9 is a block diagram for explaining the recording device 30 in the second embodiment. As shown in FIG. 9, the recording device 30 has an inputting terminal 11 for inputting information signals, a copy preventing control information detecting section 12, a timing generator 13, an SS additional generator 14, an SS additional information superimposing section 15, a writing section 16 and a system controller 200 for controlling the respective sections in the recording device 30.

As described above, the recording device 30 has a structure that does not comprise the medium intrinsic information reading section 17 which the recording device 10 in the first embodiment has.

When a user gives an instruction for starting recording image signals through an operation key section 201 connected to the system controller 200, the system controller 200 controls the respective sections in the recording device 30 to start recording the supplied information signals on the disc 100.

In the same manner as in the recording device 10, signal image signals S1 transmitted through a network such as Internet and received by the recording device 30 are supplied to the copy preventing control information detecting section 12, the timing generator 13 and the SS additional information superimposing section 15 in the recording device 30.

As described above, the copy preventing control information detecting section 12 detects the copy preventing control information according to the CGMS added to the supplied digital image signals S1 and informs the system control 200 of the detected copy preventing control information.

When the copy preventing control information from the copy preventing control information detecting section 12 indicates that any copying is prohibited, the system controller 200 controls the respective sections not to record the digital image signals S1. When the information from the copy preventing control information detecting section 12 indicates that copying is allowable, the system controller 200 controls the respective sections in the recording device 30 to record the digital image signals S1 on the recording medium 100.

To the system controller 200, a ROM 202 and a RAM 203, as well as the operation key section 201, are connected. In the ROM 202, programs which are carried out in the system controller 200, data for various processes, and information such as manufacturer's serial number of the recording device 30 are recorded. The RAM 203 is used as a working area, for example, for storing results obtained in the middle of processing.

The manufacturer's serial number of the recording device 30, recorded on the ROM 202 which the system controller 200 has is a number intrinsic to the recording device 30 and is not the same as that of any other recording device. As will be in detail described later, therefore, in the second embodiment the manufacturer's number stored in the ROM 202 is used as device intrinsic information, which is information related to the device.

In the second embodiment, when the digital image signals S1 supplied to the recording device 30 are signals which can be copied, the system controller 200 reads device intrinsic information D1 intrinsic to the recording device 30 from the ROM 202, and then supplies the device intrinsic formation D1 to the SS additional information generator 14.

As described above with reference to FIG. 2, the timing generator 13 detects reference timing signals from the supplied digital image signals S1, and generates timing signals TM and clock signals CLK for use in the respective sections in the recording device 10 according to the first embodiment, on the basis of the detected reference timing signals.

Namely, on the basis of the synchronous signals DK extracted from the digital image signals S1 the timing generator 13 generates timing signals TM and clock signals CLK in synchronization with the synchronous signals DK in the same manner as in the first embodiment.

In the SS additional information generator 14, the timing signals TM are used as reset (initializing) signals for giving timing for generating a PN code series from the head of the series, the PN code series having a predetermined code pattern which is used for spectrum-spreading. The clock signals CLK are used as signals for giving PN code-generating timing. As shown in FIG. 9, the timing signals TM and the clock signals CLK generated in the timing generator 13 are supplied to the SS additional information generator 14.

The SS additional information generator 14 receives the supply of the device intrinsic information D1, the timing signals TM and the clock signals CLK, and then generates SS device intrinsic information SD1, which is spectrum-spread device intrinsic information D1.

As described above with reference to FIG. 3, the SS additional information generator 14 has the PN code generator 141 and the multifier 142. The spread spectrum signals (SS device intrinsic information) SD1, which are spectrum-spread device intrinsic information, are generated by multiplying a PN code series PS generated, at every timing that the timing signal TM is supplied, from its head in synchronization with the clock signals CLK, and a device intrinsic information row D1R generated, at every timing that the timing signal TM is supplied, by outputting the device intrinsic information D1 in such a manner that bits thereof corresponding to the predetermined number of clocks are outputted in synchronization with the clock signals CLK. The SD1 is supplied to the SS additional information superimposing section 15.

The SS additional information superimposing section 15 receives the supply of the digital image signals S1 and the digital SS device intrinsic information SD1, and then generates digital image signals S2 on which the digital SS device intrinsic information SD1 is superimposed to supply it to the writing section 16. The writing section 16 receives the supply of the digital image signals S2 on which the digital SS additional information SD1 is superimposed and then converts this into recording digital image signals suitable for recording to write the recording digital image signals on the recording medium 100. Thus, on the recording medium 100, recorded are the digital image signals on which the SS device intrinsic information SD1, which is spectrum-spread device intrinsic information, is superimposed.

As described above, when information signals that are allowable for copying are copied for private use, in the recording device 30 according to the second embodiment, the device intrinsic information is spectrum-spread and superimposed on the information signals to be copied and subsequently the resultant signals are recorded on the recording medium.

Reproducing Device 40

The following will describe the reproducing device 40 according to the second embodiment.

Figure 10:
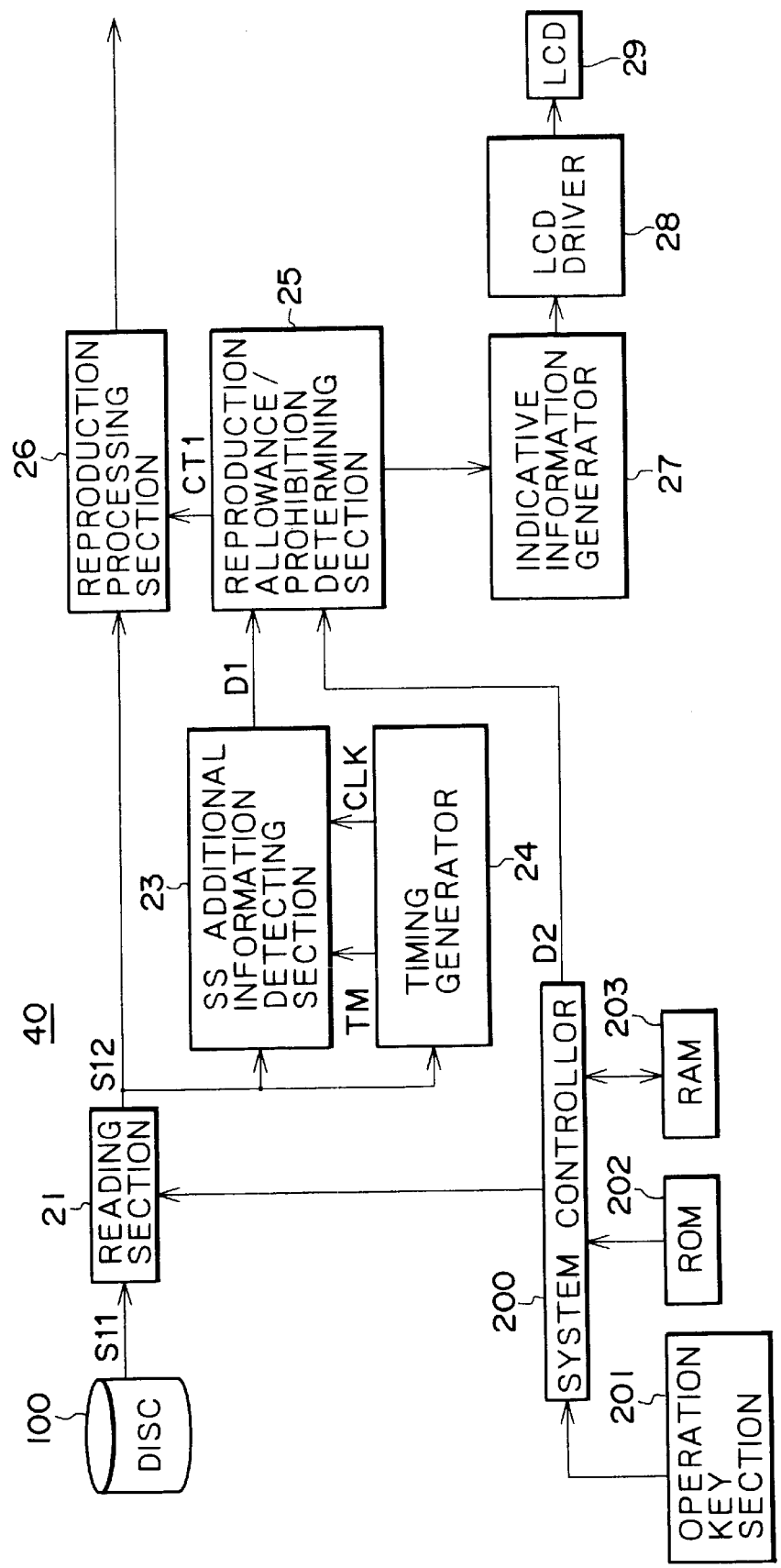
FIG. 10 is a block diagram for explaining other embodiment (using device intrinsic information) of the information signal reproducing device according to the invention.

FIG. 10 is a block diagram for explaining the reproducing device 40. As shown in FIG. 10, the reproducing device 40 has a reading section 21, an SS additional information detecting section 23, a timing generator 24, a reproduction allowance/prohibition determining section 25, a reproduction processing section 26, an indicative information generator 27, an LCD (Liquid Crystal Display) driver 28, an LCD 29, and a system controller 200 for controlling the respective sections in the reproducing device 40.

In short, the reproducing device 40 according to the second embodiment does not have the medium intrinsic information reading means 22 which the reproducing device according to the first embodiment has. The reproducing device 40 can reproduce and output digital image signals recorded on the disc 100 by, for example the aforementioned recording device 30. Namely, the reproducing device 40 can reproduce digital image signals on which spectrum-spread device intrinsic information is superimposed.

In the same manner as the reproducing device 20 according to the first embodiment, the reproducing device 40 detects the device intrinsic information superimposed on the digital image signals S12 read from the disc 100 by carrying out inverse spectrum-spreading in the SS additional information detecting section 23.

In other words, the SS additional information detecting section 23 receives the supply of clock signals CLK and timing signals TM which are generated in the timing generator 24 and synchronized with synchronous signals DS detected from the digital image signals 12, and then generates a PN code series for inverse-spreading having the same code pattern as the PN code series for spectrum-spreading the device intrinsic information D1 spectrum-spread and superimposed on the digital image signals S12, with their generating timing being consistent.

The SS additional information detecting section 23 carries our inverse spectrum-spreading by using this PN code series for inverse-spreading, so as to detect the intrinsic information D1 superimposed on the digital image signals S12 from the signals S12. The device intrinsic information D1 detected from the SS additional information detecting section 23 is supplied to the reproduction allowance/inhibition determining section 25.

The system controller 200 reads the manufacturer's serial number of the reproducing device 40 from the ROM 202 which the system controller 200 has, as the device intrinsic information D2, and then supplies this to the reproduction allowance/inhibition determining section 25.

The reproduction allowance/inhibition determining section 25 determines whether or not the device intrinsic information D1 superimposed on the digital image signals S12 read from the disc 100 and supplied from the SS additional information detecting section 23 is consistent with the device intrinsic information D2 read from the ROM 202 by the system controller 200 and then generates a control signal CT1 or CT2 according to the determined result, to supply it to the reproduction processing section 26 and the indicative information generator 27.

In other words, when the device intrinsic information D1 from the SS additional information detecting section 23 is consistent with the device intrinsic information D2 from the system controller 200, the reproduction allowance/ prohibition determining section 25 concludes that the image signals recorded on the disc 100 are signals copied in the information signal recording/reproducing device having the recording device 30 and the reproducing device 40 according to the second embodiment, and then generates the control signal CT1 that reproduction is allowable to supply this to the reproduction processing section 26.

When the control signal CT1 from the reproduction allowance/prohibition determining section 25 is the signal that reproduction is allowable, the reproduction processing section 26 performs a process for encoding the digital image signals S12 and the like processes to generate and output regenerative image signals.

When the reproduction allowance/prohibition determining section 25 determines that the device intrinsic information D1 from the SS additional information detecting section 23 is not consistent with the device intrinsic information D2 from the system controller 200, the reproduction allowance/ prohibition determining section 25 concludes that the image signals recorded on the disc 100 are not signals reproduced in the recording/reproducing device having the recording device 30 and the reproducing device 40, and then generates the control signal CT1 that reproduction is prohibited and supplies this to reproduction processing section 26. At the same time, the section 25 generates a control signal CT2 for displaying the fact that the digital signals recorded on the recording medium 100 cannot be reproduced on the LCD 29 and then supplies this to the indicative information generator 27.

In this case, the reproduction processing section 26 does not permit the digital image signals S12 to be reproduced. The indicative information generator 27 receiving the supply of the control CT2 generates message information that the image signals recorded on the recording medium 100 may be signals copied in any other recording device and they cannot be reproduced, so as to display this on the LCD 29 through the LCD driver 28.

As described above, when image signals are recorded in the second embodiment, the device intrinsic information of the recording device is spectrum-spread and superimposed on the recorded image signals. When the image signals are reproduced, the information signals cannot be reproduced in the case wherein the device intrinsic information of the reproducing device for reproduction is not consistent with the device intrinsic information spectrum-spread and superimposed on the image signals. Therefore, the image signals can be reproduced only in the recording/reproducing device by means of which the same image signals were recorded.

Thus, the information signals recorded on the recording medium by using user's recording/reproducing device having the recording device 30 and the reproducing device 40 can be reproduced only in the same recording/reproducing device; therefore, the personal user can copy and use the information signals for private use, but the information signals unfairly copied on recording media by any other recording device cannot be reproduced.

Accordingly, it is possible to effectively prevent unfair copying of the information signals for purpose of rent to the general public.

In the same manner as in the first embodiment, in the second embodiment an LED (Light Emitting Diode) and an LED driver may be disposed for informing that image signals cannot be reproduced, and an OSD (On Screen Display) or superimposing may be used to display information outputted from the reproducing device 40 on a display and inform that image signals cannot be reproduced. Alternatively, a sound warning may be given.

The Third Embodiment

In the third embodiment, for example, the recording device and the reproducing device are equipped with, for example, IC card readers, and information recorded on an IC card memory such as device ID, user ID, or recording medium ID is used as information related to the device, for example, the recording or reproducing device, instead of the aforementioned device intrinsic information. Namely, the information in the IC card memory set into the card reader disposed at the recording device or the reproducing device is used in the same manner as the device intrinsic information read from the ROM 202 in the second embodiment.

In the same manner as in the first and second embodiments, in the third embodiment a recording device 50 or a reproducing device 60 which will be in detail described later is a device such as a personal computer which can receive and transmit information signals through a network such as Internet. The recording device 50 and the reproducing device 60 correspond to a recording system in the device such as a personal computer and a reproducing system in the same device, respectively.

In the recording device 50 and the reproducing device 60 according to the third embodiment, therefore, the same reference numbers are attached to the same structures/members in the recording devices 10 and 30, and the reproducing device 20 and 40 according to the first and second embodiments, and the explanation thereof will be made simple. In the same manner as in the first embodiment, a recording disc 100 is a disc such as a CD-ROM or a DVD, and information signals to be recorded and reproduced will be described as digital image signals.

Recording Device 50

Figure 11:
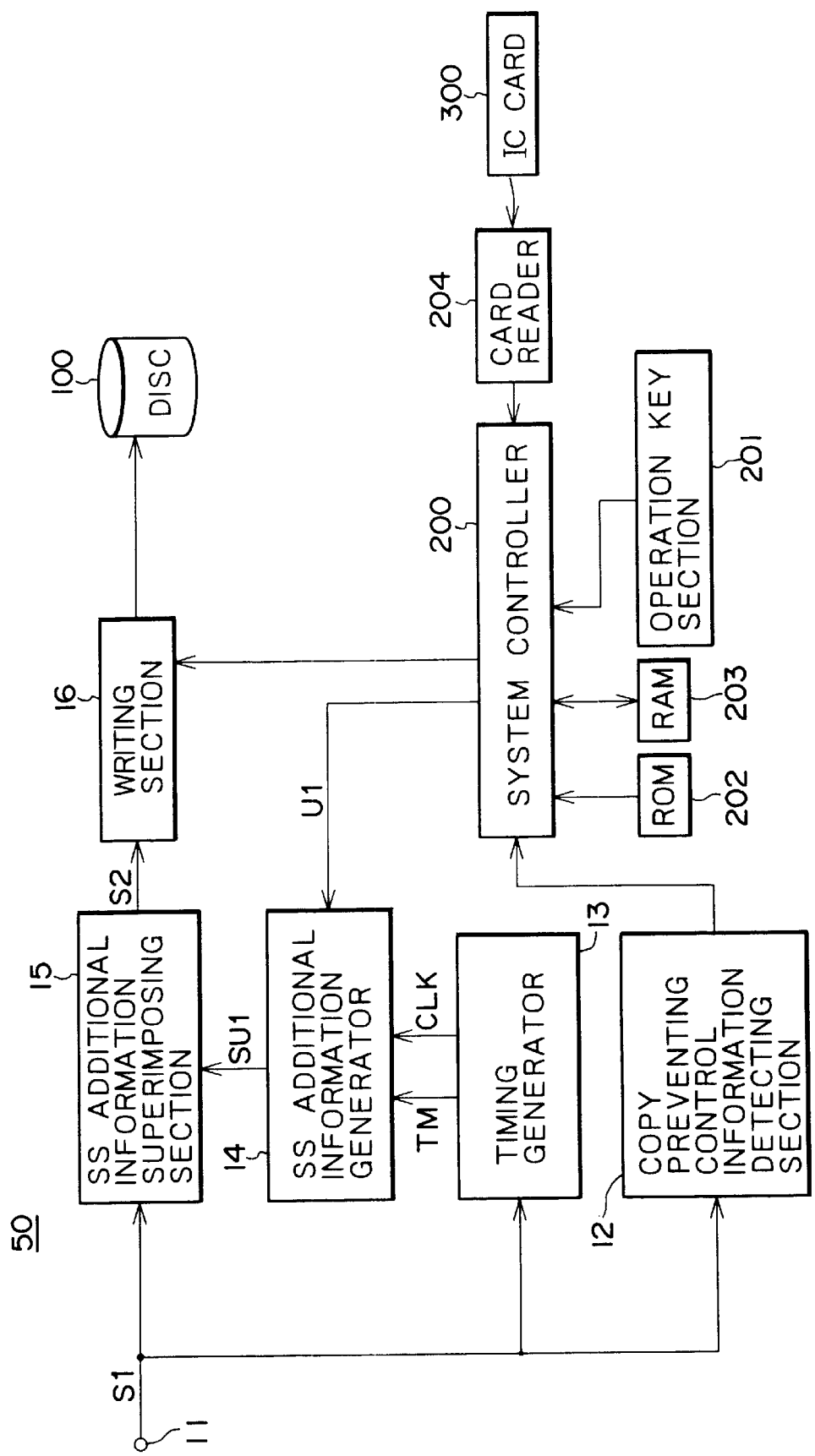
FIG. 11 is a block diagram for explaining other embodiment (using an IC card memory) of the information signal recording device according to the invention.

FIG. 11 is a block diagram for explaining the recording device 50 in the third embodiment. As shown in FIG. 11, the recording device 50 according to the third embodiment has an inputting terminal 11 for inputting information signals, a copy preventing control information detecting section 12, a timing generator 13, an SS additional generator 14, an SS additional information superimposing section 15, a writing section 16 and a system controller 200 for controlling the respective sections in the recording device 30. To the system controller 200, a card reader 204 is connected.

As described above, the recording device 50 is a device wherein the card reader 204 is disposed at the recording device 30 according to the second embodiment. An IC card memory 300 is set to the card reader 204, and used. The IC card memory 300 is sold, for example, together with the recording device 50 and used, for example, as identifying data on a user who is a buyer of the recording device 50.

When the user sets the IC card memory 300 in which the information is recorded to the card reader 204 and then gives an instruction for starting recording image signals through an operation key section 201 connected to the system controller 200, the system controller 200 controls the respective sections in the recording device 50 to start recording supplied digital image information signals S1 on a disc 100.

In the same manner as in the recording devices 10 and 30 according to the first and second embodiments, the digital image signals S1 transmitted from a network such as Internet and received in the recording device 50 are supplied to the copy preventing control information detecting section 12, the timing generator 13, and the SS additional information superimposing section 15 in the recording device 50.

In the copy preventing control information detecting section 12, the copy preventing control information added to the digital image signals S1 is detected and then the result is given to the system controller 200.

When the copy preventing control information detected by means of the copy preventing control information detecting section 12 indicates that any copying is prohibited, the system controller 200 controls the respective sections in the recording device 50 not to record the digital image signals S1. When the copy preventing control information from the copy preventing control information detecting section 12 indicates that copying is allowable, the system controller 200 controls the respective sections in the recording device 50 to record the digital image signals S1 on the recording medium 100.

When the digital signals S1 supplied to the recording device 50 are signals allowable for copying, the system controller 200 controls the card reader 204 to read ID information U1 from the IC card memory 300 set to the card reader 204 and supply the ID information U1 to the SS additional information generator 14.

As described above with reference to FIG. 2, the timing generator 13 detects reference timing signals from the supplied digital image signals S1, and generates timing signals TM and clock signals CLK for use in the respective sections in the recording device 50 according to the third embodiment, on the basis of the detected reference timing signals DK.

Namely, on the basis of the synchronous signals DK extracted from the digital image signals S1 the timing generator 13 generates timing signals TM and clock signals CLK in synchronization with the synchronous signals.

As described above with reference to FIG. 3, the SS additional information generator 14 has the PN code generator 141 and the multifier 142. The spread spectrum signals (SSID information) SU1, which are spectrum-spread ID information, are generated by multiplying a PN code series PS generated, at every timing that the timing signal TM is supplied, from its head in synchronization with the clock signals CLK, and an ID information row U1R generated, at every timing that the timing signal TM is supplied, by outputting the ID information U1 in such a manner that bits thereof corresponding to the predetermined number of clocks are outputted in synchronization with the clock signals CLK. The SU1 is supplied to the SS additional information superimposing section 15.

The SS additional information superimposing section 15 generates digital image signals S2 by superimposing the digital SS ID information SU1 on the digital image signals S1, and then supplies the signals S2 to the writing section 16. The writing section 16 receives the supply of the digital image signals S2 on which the digital SS ID information is superimposed and then converts this into recording digital image signals suitable for recording to write the recording digital image signals on the recording medium 100. Thus, on the recording medium 100, recorded are the digital image signals on which the SS ID information SU1, which is spectrum-spread ID information, is superimposed.

As describe above, when the supplied digital image signals are recorded on the disc 100, the recording device according to the third embodiment reads the ID information from the IC card memory 300 set to the card reader 204, spectrum-spreads and superimposes this ID information on the digital image signals S1 to be recorded, and then records the digital image signals S2 on which the spectrum-spread user-identifying data are superimposed on the disc 100.

Reproducing Device 60

The following will describe the reproducing device 60 according to the third embodiment.

Figure 12:
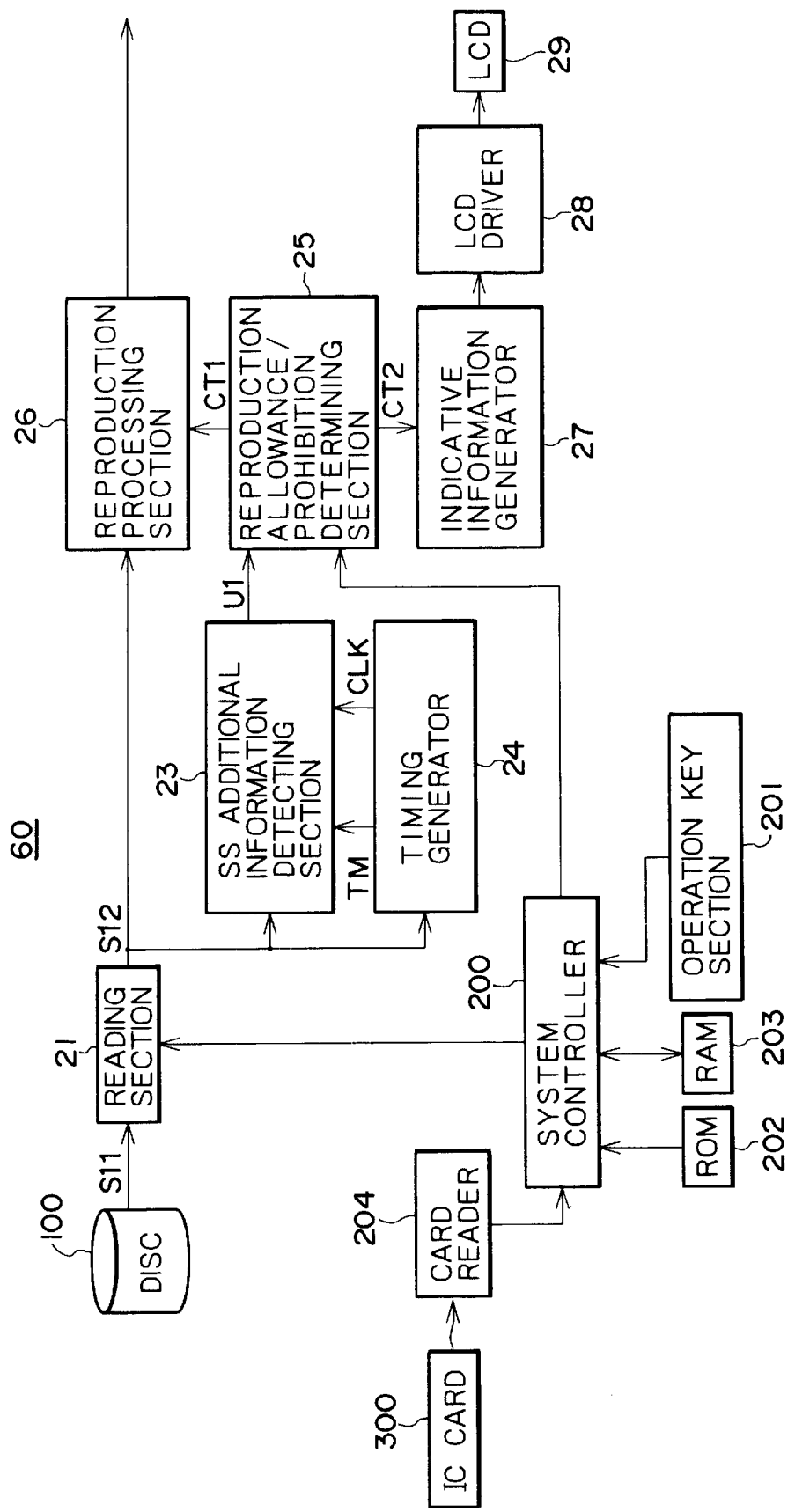
FIG. 12 is a block diagram for explaining other embodiment (using an IC card memory) of the information signal reproducing device according to the invention.

FIG. 12 is a block diagram for explaining the reproducing device 60 in the third embodiment. As shown in FIG. 12, the reproducing device 60 has a reading section 21, an SS additional detecting section 23, a timing generator 24, a reproduction allowance/prohibition determining section 25, a reproduction processing section 25, an indicative information generator 27, an LCD (Liquid Crystal Display) driver 28, an LCD 29 and a system controller 200 for controlling the respective sections in the reproducing device 60. To the system controller 200, a card reader 204 is connected.

As described above, the reproducing device 60 according to the third embodiment is a device wherein the card reader 204 is disposed at the reproducing device 40 according to the second embodiment. An IC card memory 300 is set to the card reader 204, and used in the same manner as in the aforementioned recording device 50.

In the same manner as in the reproducing devices 20 and 40 according to the first and second embodiments, in the reproducing device 60 according to the third embodiment the SS additional information detecting section 23 detects ID information U1 spectrum-spread and superimposed on the digital image signals S12 by carrying out inverse spectrum-spreading. The ID information U1 detected by the SS additional information detecting section 23 is supplied to the reproduction allowance/prohibition determining section 25.

The system control 200 controls the card reader 204 which the system controller 200 has, and then reads the ID information U2 from the IC card memory 300 set to the card reader 204 to supply this information U2 to the reproduction allowance/prohibition determining section 25.

The reproduction allowance/prohibition determining section 25 determines whether or not the ID information U1 superimposed on the digital image signals read from the disc 100 and supplied from the SS additional information detecting section 23 is consistent with the ID information U2 read from the IC card memory 300 set to the card reader 204 by control of the system controller 200, and then generates a control signal CT1 or CT2 according to the determined result to supply this signal to the reproduction processing section 26 and the indicative information generator 27.

In short, when the ID information U1 from the SS additional information detecting section 23 is consistent with the ID information U2 from the system controller 200, the reproduction allowance/prohibition determining section 25 concludes that the instruction for reproduction is given by a possessor of the IC card memory used in recording, and then generates the control signal CT1 that reproduction is allowable to supply this signal to the reproduction processing section 26.

When the control signal CT1 from the reproduction allowance/prohibition determining section 25 is a signal that reproduction is allowable, the reproduction processing section 26 generates regenerative image signals by carrying out processes such as encoding process of the digital image signals S12, and then outputs these signals.

When the reproduction allowance/prohibition determining section 25 determines that the ID information U1 from the SS additional information detecting section 23 is not consistent with the ID information U2 from the system controller 200, the section 25 concludes that the instruction for reproduction is given by a person who is not the possessor of the IC card used in recording, and then generates the control signal CT1 that reproduction is prohibited to supply this signal to the reproduction processing section 26. At this time, the section 25 generates a control signal CT2 for displaying the fact that the digital signals recorded on the recording medium 100 cannot be reproduced on the LCD 29 and then supplies this to the indicative information generator 27.

In this case, the reproduction processing section 26 does not permit the digital image signals S12 to be reproduced. The indicative information generator 27 receiving the supply of the control CT2 generates message information that the image signals recorded on the recording medium 100 may be signals copied by any other users and they cannot be reproduced, so as to display this on the LCD 29 through the LCD driver 28.

As described above, in the third embodiment the ID information U1 recorded on the IC card memory 300 when the image signals are recorded is read, spectrum-spread and then superimposed on the recorded image signals. When the image signals are reproduced, reproduction cannot be carried out if the ID information U1 read from the IC card memory 300 set to the card reader 204 of the reproducing device is not consistent with the ID information U2 spectrum-spread and superimposed on the image signals. Therefore, reproduction can be carried out only in the case of using the same IC card memory 300 in recording and reproducing processes.

Thus, information signals recorded on the medium by using the IC card memory 300 in the recording device 50 which the user has can be reproduced in any other reproducing device by setting the IC card memory to the device and reproducing the signals.

Therefore, when the recording device 50 according to the third embodiment is used to record the information signals, reproduction can be carried out by setting the IC card memory 300 used in recording to the reproducing device 60 according to the third embodiment. The recording medium on which the information signals are recorded by means of the recording device 50 and the IC card memory 300 are used as a pair, so that any reproducing device having the card reader 204 can reproduce the information signals recorded on the recording medium. Accordingly, information signals recorded on a recording medium at home can be reproduced in any other place. Thus, a recording/reproducing system having appropriate flexibility can be constructed.

In this case an individual user can copy and use information signals for personal use. However, the IC card memory is necessary in reproducing, and consequently it is possible to effectively prevent unfair copying of the information signals and rent of the copied signals to the public.

In the same manner as in the first and second embodiments, in the thied embodiment an LED (Light Emitting Diode) and an LED driver may be disposed for informing that image signals cannot be reproduced, and an OSD (On Screen Display) or superimposing may be used to display information outputted from the reproducing device 40 on a display and inform that image signals cannot be reproduced. Alternatively, a sound warning may be given.

In the first, second and third embodiments, additional information, such as medium intrinsic information, device intrinsic information and ID information, added to image signals, which are information signals, is spectrum-spread and superimposed.

However, the invention is not limited to such embodiments. Electrical watermark information corresponding to additonal information superimposed on information signals may be generated in any other manner, so as to superimpose the watermark information on the information signals.

The Fourth Embodiment

In the fourth embodiment, medium intrinsic information is enciphered and then it is added to information signals. The information signals to which the enciphered medium intrinsic information is added are-recorded on a recording medium. When the information signals recorded on the recording medium are reproduced, the medium intrinsic information enciphered and added to the information signals to be reproduced is decoded. When the decoded medium intrinsic information is consistent with the medium intrinsic information of the recording medium on which the information signals are recorded, reproduction is carried out.

In the fourth embodiment, a recording device 70 or a reproducing device 80 which will be in detail described below is a device such as a personal computer which can receive and transmit information signals through a network such as Internet, in the same manner as in the first embodiment. Therefore, in the recording and reproducing devices 70 and 80, the same reference numbers are attached to the same structures/elements as in the recording and reproducing devices according to the aforementioned embodiments, and the explanation thereof will be made simple.

In the same manner as in the first embodiment, a recording disc 100 is a disc such as a CD-ROM or a DVD, and information signals to be recorded and reproduced will be described as digital image signals in the same manner in the aforementioned embodiments.

Recording Device 70

Figure 13:
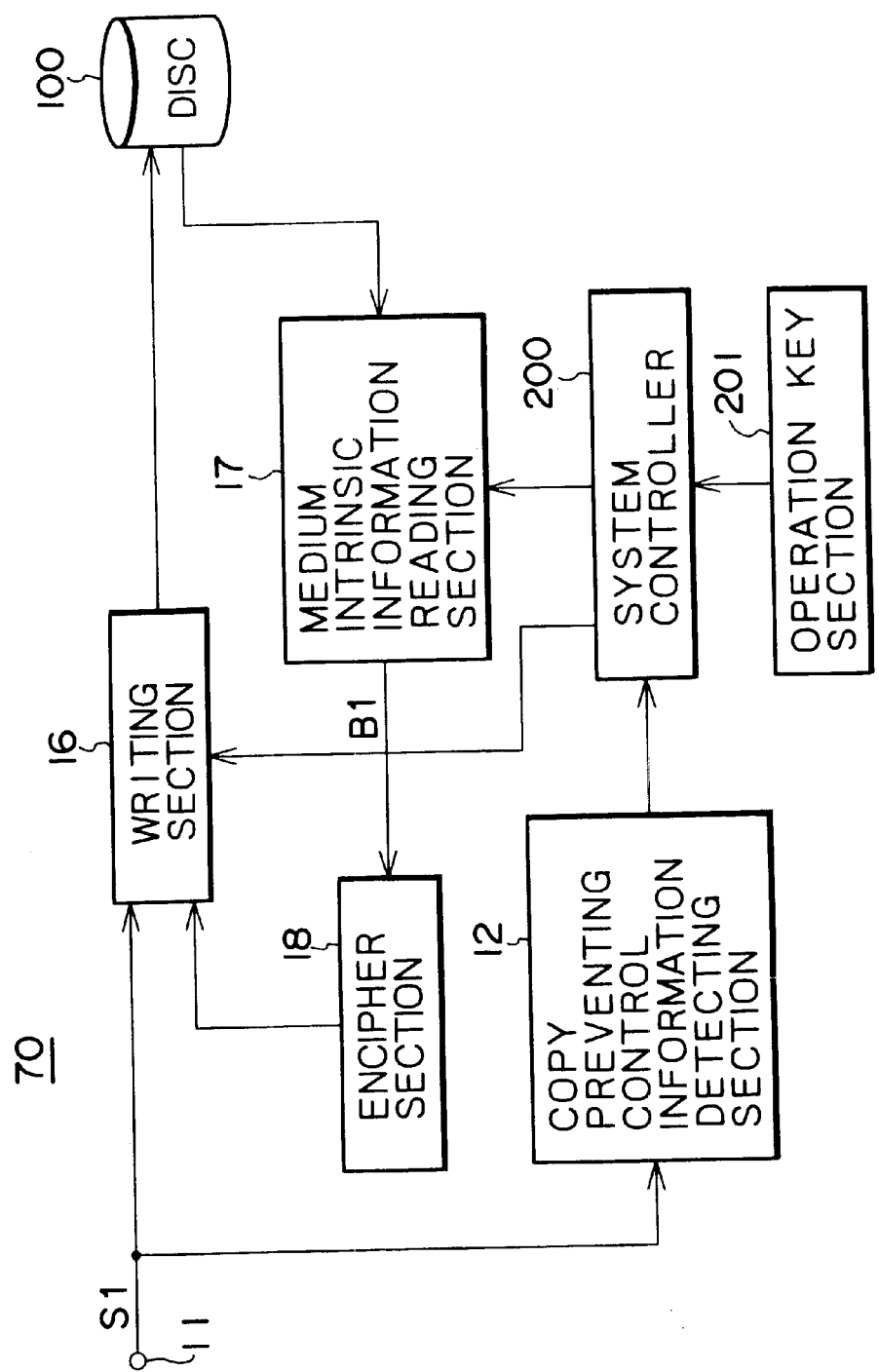
FIG. 13 is a block diagram for explaining other embodiment (using enciphered medium intrinsic information) of the information signal recording device according to the invention.

FIG. 13 is a block diagram for explaining the recording device 70 in the fourth embodiment. As shown in FIG. 13, the recording device 70 has an inputting terminal 11 for inputting information signals, a copy preventing control information detecting section 12, a writing section 16, a medium intrinsic information reading section 17, an enciphering section 18 and a system controller 200 for controlling the respective sections in the recording device 70.

When the user gives for starting reproducing the image signals through an operation key section 201 connected to the system controller 200, the system controller 200 controls the respective sections in the recording device 70 to start recording the supplied information signals on the disc 100.

In the same manner as in the recording device according to the aforementioned embodiments, signal image signals S1 transmitted through a network such as Internet and received by the recording device 70 are supplied to the copy preventing control information detecting section 12 and the writing section 16 in the recording device 70.

The copy preventing control information detecting section 12 detects the copy preventing control information according to the CGMS added to the digital image signals S1 and informs the system control 200 of the detected copy preventing control information.

When the copy preventing control information from the copy preventing control information detecting section 12 indicates that any copying is prohibited, the system controller 200 controls the respective sections in the recording section 70 not to record the digital image signals S1. When the information from the copy preventing control information detecting section 12 indicates that copying is allowable, the system controller 200 controls the respective sections in the recording device 70 to record the digital image signals S1 on the recording medium 100.

When the digital image signals S1 are signals that are allowable for copying, the medium intrinsic reading 17 reads a serial number recorded, for example, in the TOC of the disc 100, as medium intrinsic information B1, and then supplies this to the enciphering section 18.

The enciphering section 18 enciphers the medium intrinsic information B1 in a predetermined way, and then supplies the enciphered medium intrinsic information to the writing section 16. In the present embodiment, the writing section 16 adds the enciphered medium intrinsic information to the digital image signals to be recorded on the disc 100. Thus, the digital image signals to which the enciphered medium intrinsic information is added are recorded on the recording disc 100.

As described above, when supplied digital image signals are recorded on the disc 100 in the recording device 70 according to the fourth embodiment, the medium intrinsic information of the disc 100 is enciphered, and then this enciphered information is added to the digital image signals to be recorded on the disc 100. The signals thus obtained are recorded on the disc 100.

Reproducing Device 80

The following will describe the reproducing device 80 according to the fourth embodiment.

Figure 14:
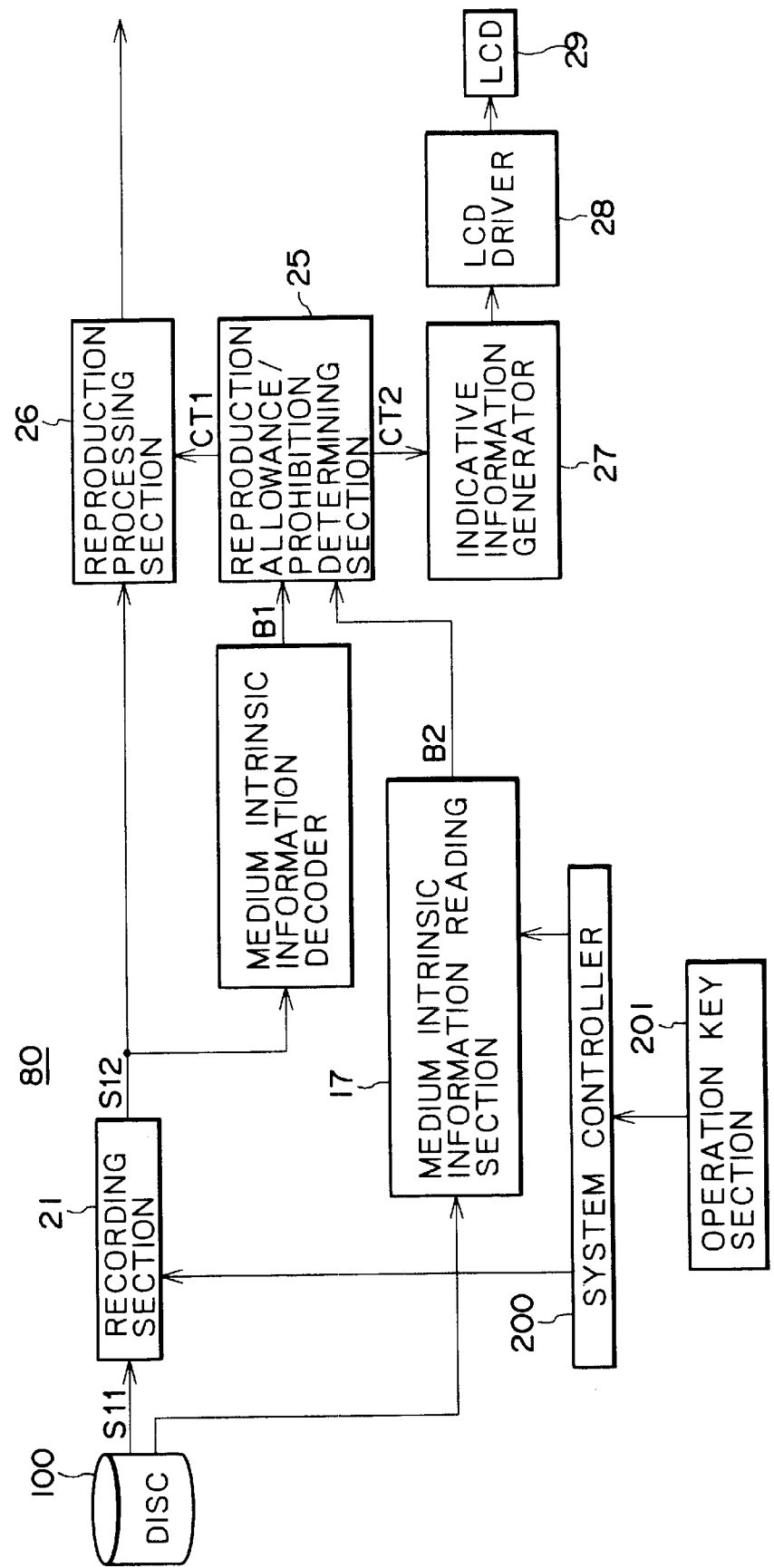
FIG. 14 is a block diagram for explaining another embodiment (using enciphered medium intrinsic information) of the information signal reproducing device according to the invention.

FIG. 14 is a block diagram for explaining the reproducing device 80 in the fourth embodiment. As shown in FIG. 14, the reproducing device 80 has a reading section 21, a medium intrinsic information reading section 22, a reproduction allowance/prohibition determining section 25, a reproduction processing section 25, an indicative information generator 27, an LCD (Liquid Crystal Display) driver 28, an LCD 29, a medium intrinsic information decoder 32, and a system controller 200 for controlling the respective sections in the reproducing device 80.

Thus, the reproducing device 80 according to the fourth embodiment has the medium intrinsic information decoder 32 so that the image information to which the enciphered medium intrinsic information is added in the recording device 70 can be reproduced.

The reproducing device 40 according to the fourth embodiment supplies the digital image signals S12 from the reading section 21 to the reproduction processing section 26 and the medium intrinsic information decoder 32.

The medium intrinsic information decoder 32 decodes the enciphered medium intrinsic information B1 added to the digital image signals S12 in accordance with the enciphering way used in the recording device 70, and then supplies the decoded medium intrinsic information B1 to the reproduction allowance/prohibition determining section 25.

The medium intrinsic information reading section 22 reads the serial number of the disc 100, as medium intrinsic information B2, from the disc 100, and then supplies the medium intrinsic information B2 to the reproduction allowance/prohibition determining section 25.

The reproduction allowance/prohibition determining section 25 determines whether or not the medium intrinsic information B1 from the decoder 52 is consistent with the medium intrinsic information B2 from the medium intrinsic information reading section 22.

In the same manner as in the first embodiment, when the medium intrinsic information B1 from the decoder 32 is consistent with the medium intrinsic information B2 from the medium intrinsic information reading section 22, the reproduction allowance/prohibition determining section 25 determines that the image signals recorded on the disc 100 are signals properly copied, and then generates the control signal CT1 that reproduction is allowable to supply this to the reproduction processing section 26.

When the control signal CT1 from the reproduction allowance/prohibition determining section 25 is a signal that reproduction is allowable, the reproduction processing section 26 carries out processes such as a process of decoding the digital image signals S12, and then generates and outputs regenerative image signals.

When the medium intrinsic information B1 from the decoder 32 is not consistent with the medium intrinsic information B2 from the medium intrinsic information reading section 22, the reproduction allowance/prohibition determining section 25 concludes that the image signals recorded on the disc 100 are not signals properly copied and then generates the control signal CT1 that reproduction is prohibited to supply this signal to the reproduction processing section 26. At the same time, the section 25 generates a control signal CT2 for displaying the fact that the digital signals recorded on the recording medium 100 cannot be reproduced on the LCD 29 and then supplies this to the indicative information generator 27.

In this case, the reproduction processing section 26 does not permit the digital image signals S12 to be reproduced. The indicative information generator 27 receiving the supply of the control signal CT2 generates message information that the image signals recorded on the recording medium 100 cannot be reproduced, so as to display this on the LCD 29 through the LCD driver 28.

As described above, in recording process in the fourth embodiment, the medium intrinsic information of the disc 100 on which the image signals are to be recorded is enciphered, and then the enciphered medium intrinsic information is added to the image signals to be recorded. The resultant signals are recorded on the disc 100.

In reproducing process, only when the enciphered medium intrinsic information added to the image signals to be reproduced is decoded and then the decoded medium intrinsic information is consistent with the medium intrinsic information of the disc on which the image signals to be reproduced are recorded, reproduction is carried out.

In this case, the medium intrinsic information added to the recorded image signals is enciphered; therefore, it cannot be altered easily.

In the same manner in the first embodiment, when in the fourth embodiment for copying for private use an individual user uses the recording device 70 to record image signals that are allowable for copying, the medium intrinsic information superimposed on the information signals to be recorded on the disc is consistent with the medium intrinsic information of the disc on which the information signals are recorded. When the image signals are not signals copied in an ordinary manner in the recording device 70, the medium intrinsic information superimposed on the information signals recorded on the disc is not consistent with the medium intrinsic information of the disc on which the information signals are recorded.

Thus, it is impossible to reproduce other signals than the image signals copied in an ordinary manner by using the recording device 70, in the reproducing device 80, thereby preventing unfair copying.

In the fourth embodiment, the medium-related information is used. However, in the same manner as in the second and third embodiments, the device intrinsic information and the ID information recorded in the IC card memory may be enciphered and then the enciphered information may be added to the image signals to be recorded on the disc.

In the case, the enciphered device intrinsic information or user-identifying data may be decoded in the reproducing device. When the user-identifying data stored in the IC cad memory are used, card readers may be disposed at the recording device 70 and the reproducing device 80.

In the same manner as in the aforementioned embodiment, in the fourth embodiment an LED (Light Emitting Diode) and an LED driver are disposed for informing that image signals cannot be reproduced, and an OSD (On Screen Display) or superimposing is used to display information outputted from the reproducing device 40 on a display and inform that image signals cannot be reproduced. Alternatively, a sound warning may be given.

Variations

In the first, second and third embodiments, the medium intrinsic information, the device intrinsic information, the ID information and the like are spectrum-spread or enciphered to be superimposed or added to information signals. However, the present invention is not limited to such manners.

In the case, for example, wherein image signals are recorded on a recording medium, additional information for being added to the image signals to be recorded is generated on the basis of, for example, the medium intrinsic information and then the generated additional information is added to the image regenerative signals. The resultant signals are recorded in the recording medium such a disc. When the image signals recorded on the recording medium in this manner are reproduced, the additional information added to the image signals are detected, on the basis of the medium intrinsic information obtained when the image signals are reproduced.

When the medium intrinsic information obtained in recording is different from the medium intrinsic information obtained in reproduction, a variation of the present invention may be constructed so that the additional information generated and added on the basis of the medium intrinsic information in recording cannot be detected from the information signals to be reproduced. Thus, the information signals can be reproduced only when the additional information is detected from the information signals to be reproduced.

In such a manner as above, when image signals are recorded, the medium intrinsic information obtained at that time may be used as a key for generating additional information to be added to the image signals. On the other hand, when the image signals are reproduced, the medium intrinsic information obtained at that time may be used as a key for detecting the additional information added to the image signals to be reproduced.

In, for example, the fourth embodiment, the medium intrinsic information is enciphered; however, additional information may be generated on the medium intrinsic information to add the generated additional information to image signals to be recorded.

Namely, in the enciphering section 18 in the enciphering device 70 shown in FIG. 13, the medium intrinsic information B1 from the medium intrinsic information reading section 17 is used as an enciphering key to encipher it. Thus, additional information is generated. The generated additional information is then supplied to the writing section 16 and added to image signals to be recorded on the disc 100. The image signals to which the additional information is added are recorded on the disc 100.

On the other hand, in the reproducing device 80, shown in FIG. 14, for reproducing the image signals recorded on the disc 100 in the recording device 70, the medium intrinsic information B2 from the medium intrinsic information reading section is supplied to the medium intrinsic information decoder 32. In this medium intrinsic information decoder 32, the medium intrinsic information B2 is used as a decoding key to decode it. By this decoding process, a process is performed for detecting the additional information added to the image signals S12, and then the result obtained from the detecting process is given for notice to the reproduction allowance/prohibition determining section 25.

The reproduction allowance/prohibition determining section 25 controls the reproduction processing section 26 to reproduce the image signals when the additional information is detected with reference to the result supplied from the medium intrinsic information decoder 32, while the section 25 controls the reproduction processing section 25 not to reproduce the image signals when the additional information is not detected.

When the additional information is not detected so as not to reproduce the image signals in the aforementioned case, a message that the image signals are not reproduced may be displayed or a sound warning maybe given. Of course, at this time the image signals recorded on the disc may be erased.

In this context, the case of using the medium intrinsic information was explained as an example; however, the device intrinsic information, the ID information can be used as a key for generating additional information added to image signals, or a key for detecting additional information added to image signals.

In such a manner as above, a variation of the invention can be constructed so that in recording process additional information is generated on the basis of information on the recording medium, such as the medium intrinsic information, information on the device, such as the device intrinsic information, or ID information recorded on the IC card memory, and then the additional information is added to image signals and recorded on the recording medium, while in reproducing process the additional information added to the image signals is detected on the basis of the information on the recording medium, such as the medium intrinsic information, the information on the device, such as the device intrinsic information, or the ID information recorded on the IC card memory.

The same information signal erasing section as in the reproducing device 20 according to the first embodiment may be added to the reproducing section 40, 60 or 80 according to the second, third or fourth embodiment, so that information signals unfairly copied will be erased.

When the aforementioned recording/reproducing device comprising the recording device 10 and the reproducing device 20 is formed, the medium intrinsic information reading section 17 and 22 can be composed of a single circuit so that the circuit will be used commonly in the recording and reproducing devices. In the same manner, when the aforementioned recording/reproducing device comprising the recording device 50 and the reproducing device 60 is formed, the single card reader 204 may be used commonly in the recording and reproducing devices.

In the respective embodiments, the information signals to be recorded and reproduced are image signals but are not limited to the image signals. In the present invention, there can be used sound signals, program data and other various information signals. Furthermore, the information signals are not limited to digital signals, and may be analog signals.

In the aforementioned embodiments, the recording and reproducing devices are personal computers, but are not limited to the computers. The invention can be applied to various recording devices, reproducing devices and recording/reproducing devices such as DVDs, VTRs, and tape recorders.

The recording medium is not limited to discs such as CD-ROMs or DVDs, but may be any one of various recording media such as small-sized magnetic optical discs called MDs, optical discs, magnetic tapes or magnetic discs.

In the first embodiment, the serial number recorded in the TOC of the disc 100 is used as the medium intrinsic information. However, in recording media which are used in the situation that they are put in cases, for example, MDs, video tapes or floppy discs, the cases in which the recording media are put may be equipped with memories for memorizing information on the recording media, or information on data recorded on the recording media.

Of course, in the case wherein the case in which the recording medium is put is equipped with the memory for memorizing the information on the recording medium, the information memorized in the memory may be used as the information on the recording medium.

As described above, the present invention makes it possible to reproduce information signals copied in an ordinary manner without any problem, and not to reproduce information signals copied in other manner than the ordinary manner, thereby preventing unfair copying of the information signals other than copying for private use.

The invention also makes it impossible to deteriorate information signals by the medium intrinsic information nor easily alter the medium intrinsic information since the medium intrinsic information, as additional information, added to the information signals is spectrum-spread and superimposed on the information signals.

The invention also makes it possible to add the medium intrinsic information as a so-called electrical watermark to information signals in various manners, and detect the electrical watermark added to the information signals to be used. Since the medium intrinsic information is a very low level signal, the medium intrinsic information does not deteriorate the information signals and further the medium intrinsic information cannot be easily altered.

The invention also makes it impossible to easily carry out unfair alteration of medium intrinsic information superimposed on information signals with ease because the medium intrinsic information can be enciphered and superimposed on the information signals.

The invention also makes it possible to prevent unfair copying of information signals, as well as not to use information signals unfairly copied.

The invention also makes it possible to know that information signals are not reproduced because the medium intrinsic information superimposed or added to the information signals is different from the medium intrinsic information of the recording medium on which the information signals are recorded. Thus, the inventions makes it possible that when the information signals are not reproduced, any user does not mistake the reason that the signals are not reproduced for trouble of the reproducing device, or the like trouble

What is claimed is:

1. An information signal recording device for recording information signals on a recording medium having thereon an area different from an area for recording the information signals and in which medium-related information intrinsic to the recording medium is recorded, or having a unit accompanying the recording medium in which the medium-related information intrinsic to the recording medium is recorded, the recording device comprising:

medium-related information reading means for reading the medium-related information including a serial number intrinsic to the individual recording medium from a table of contents in one of the recording medium and the unit accompanying the recording medium;

information adding means for adding the medium-related information read by the medium-related information reading means to the information signals; and recording means for recording the information signals to which the medium-related information has been added by the information adding means on the recording medium.

2. The information signal recording device according to claim 1, wherein the information adding means comprises spreading means for spectrum-spreading the medium-related information from the medium-related information reading means, and means for superimposing the medium-related information spectrum-spread by the spreading means on the information signals to be recorded.

3. The information signal recording device according to claim 1, wherein the information adding means comprises signal level converting means for converting the medium-related information from the medium-related information reading means into a minute level signal, and means for adding the medium-related information converted into the minute level signal by the signal level converting means to the information signals to be recorded.

4. The information signal recording device according to claim 1, wherein the information adding means comprises enciphering means for enciphering the medium-related information from the medium-related information reading means, and means for adding the medium-related information enciphered by the enciphering means to the information signals to be recorded.

5. The information signal recording device according to claim 1, wherein said information adding means comprises:

means for providing a code; and means for superimposing the medium-related information from the medium-related information reading means on the information signals using said code.

6. An information signal recording device for recording information signals on a recording medium having formed thereon an area different from an area for recording the information signals and in which medium-related information intrinsic to the recording medium is recorded, or having a unit accompanying the recording medium in which the medium-related information intrinsic to the recording medium is recorded, the recording device comprising:

medium-related information reading means for reading the medium-related information including a serial number intrinsic to the individual recording medium from a table of contents in one of the recording medium and the unit accompanying the recording medium;

additional information converting means for converting additional information on the basis of the medium-related information from the medium-related information reading means;

information adding means for adding the additional information converted by the additional information converting means to the information signals; and recording means for recording the information signals to which the additional information has been added by the information adding means on the recording medium.

7. The information signal recording device according to claim 6, wherein the additional information converting means comprises means for enciphering the additional information by using the medium-related information from the medium-related information reading means.

8. An information signal recording method for recording information signals on a recording medium having thereon an area different from an area for recording the information signals and in which medium-related information intrinsic to the individual recording medium is recorded or having a unit accompanying the recording medium in which the medium-related information intrinsic to the individual recording medium is recorded, the method comprising the steps of:

reading the medium-related information including a serial number intrinsic to the individual recording medium from a table of contents in one of the recording medium and the unit accompanying the recording medium;

adding the medium-related information read in said step of reading to, the information signals; and recording on the recording medium the information signals to which the medium-related information has been added by said step of adding.

9. The information signal recording method according to claim 8, wherein said step of adding comprises the steps of:

spectrum-spreading the medium-related information from said step of reading; and superimposing the medium-related information spectrum spread by said step of spectrum-spreading on the information signals to be recorded.

10. The information signal recording method according to claim 8, wherein said step of adding comprises the steps of:

converting the medium-related information from said step of reading into a minute signal level; and adding the medium-related information converted into the minute level signal by said step of converting to the information signals to be recorded.

11. The information signal recording method according to claim 8, wherein said step of adding comprises the steps of:

enciphering the medium-related information from said step of reading; and adding the enciphered medium-related information from said step of enciphering to the information signals to be recorded.

12. The information signal recording method according to claim 8, wherein said step of adding comprises the steps of:

providing a code; and superimposing the medium-related information from said step of reading on said information signals using said code.

13. An information signal recording method for recording information signals on a recording medium having formed thereon an area different from an area for recording the information signals and in which medium-related information intrinsic to the individual recording medium is recorded or having a unit accompanying the recording medium in which the medium-related information intrinsic to the individual recording medium is recorded, the method comprising the steps of:

reading the medium-related information including a serial number intrinsic to the individual recording medium from a table of contents of one of the recording medium and the unit accompanying the recording medium;

converting additional information on the basis of the medium-related information from said step of reading;

adding the additional information converted by said step of converting to the information signals; and recording on the recording medium the information signals to which the additional information has been added by said step of adding.

14. The information signal recording method according to claim 13, wherein said step of converting comprises the step of converting comprises the step of enciphering the additional information by using the medium-related information from said step of reading.

15. The information signal recording method according to claim 13, wherein said step of adding comprises the steps of:

providing a code; and superimposing the medium-related information from said step of reading on the information signal using said code.

* * * * *